United States Patent
Liskov

(10) Patent No.: US 7,289,519 B1
(45) Date of Patent: Oct. 30, 2007

(54) METHODS AND APPARATUS FOR PROCESSING CONTENT REQUESTS USING DOMAIN NAME SERVICE

(75) Inventor: Barbara Liskov, Waltham, MA (US)

(73) Assignee: Cisco Technology, Inc., San Jose, CA (US)

( * ) Notice: Subject to any disclaimer, the term of this patent is extended or adjusted under 35 U.S.C. 154(b) by 1061 days.

(21) Appl. No.: 10/136,264

(22) Filed: May 1, 2002

(51) Int. Cl.
*H04L 12/28* (2006.01)
*H04L 12/56* (2006.01)

(52) U.S. Cl. ............... 370/400; 370/389; 370/392; 370/230; 709/217; 709/201

(58) Field of Classification Search ............ None
See application file for complete search history.

(56) References Cited

U.S. PATENT DOCUMENTS

| | | | |
|---|---|---|---|
| 6,304,913 B1 * | 10/2001 | Rune | 709/241 |
| 6,785,704 B1 * | 8/2004 | McCanne | 718/105 |
| 2002/0010798 A1 * | 1/2002 | Ben-Shaul et al. | 709/247 |
| 2003/0097564 A1 * | 5/2003 | Tewari et al. | 713/171 |
| 2003/0115283 A1 * | 6/2003 | Barbir et al. | 709/217 |
| 2005/0010653 A1 * | 1/2005 | McCanne | 709/219 |
| 2005/0021863 A1 * | 1/2005 | Jungck | 709/246 |
| 2005/0044270 A1 * | 2/2005 | Grove et al. | 709/238 |

* cited by examiner

*Primary Examiner*—Chirag G. Shah
(74) *Attorney, Agent, or Firm*—Chapin IP Law, LLC; Barry W. Chapin, Esq.

(57) ABSTRACT

Mechanisms and techniques provide a system that operates in content routers and content engines in peered content distribution networks. Using domain name specifications associated with the content distribution networks, a content router may provide a forward domain resolution response to redirect a domain resolution request to another peered content distribution network. If a secondary content router determines that a content request is not to be processed in its content distribution network, it may respond with: a reflected domain resolution response that is returned to a primary content router or a forward domain resolution response. Content engines may also reflect content requests back to the primary content router by providing: a reflected redirect content response to a client, or a redirect forward content response that must be resolved. After termination of a peering relationship, a reflection continuation period may be defined during which secondary content networks provide reflected or forwarded responses.

40 Claims, 8 Drawing Sheets

METHODS AND APPARATUS FOR PROCESSING CONTENT REQUESTS USING DOMAIN NAME SERVICE

BACKGROUND OF THE INVENTION

Computer networks such as the Internet allow computer systems to exchange data or content in a variety of ways. One popular technique for accessing content over a computer network such as the Internet uses a suite of protocols commonly referred to as the World Wide Web. In a typical operation of the World Wide Web, a user at a client computer system operates a software application called a web browser to access content served by a web server computer system over the computer network. The content may be any type of data or information such as documents, web pages, streams of audio or video data or the like. In particular, a user can request content from a web server by selecting or clicking a hyperlink that the web browser displays on the client computer system (e.g., within a graphical user interface). This operation causes the web browser to reference a uniform resource locator or URL which identifies, among other things, a communications protocol that the browser is to use to access the content, a network address or domain name associated with a computer system (i.e., a web server) that the browser is to communicate with in order to retrieve the content, and the file name, path or other specific reference to the content itself. The web browser can use the URL information to send a content request over the network to the computer system that stores the content in order to have a computer system return the content to the web browser.

In many situations, a URL contains the domain name of the computer system that the request for content is to be directed towards rather than the actual network address (e.g., IP address) of the specific web server computer system can serve the content. As an example, a URL such as http://www.cisco.com/content.html indicates that the HTTP protocol is to be used to access content referred to as "content.html" from a computer system associated with the domain name "www.cisco.com." The name www.cisco.com is referred to as a domain name since it references a domain of content. Before a web browser can transmit a content request containing this URL to a computer system associated with a www.cisco.com domain name, the web browser must use another system called the domain name system or DNS to convert or "resolve" the domain name www.cisco.com into a network address of a specific computer associated with that domain name that can receive and service the request for the content. To resolve a domain name into a network address, the web browser passes the domain name www.cisco.com in a domain resolution request over the network to a domain name server computer system (DNS server) associated with the client computer system (e.g., associated with the LAN or network in which the client operates).

The DNS server associated with that client computer system receives the domain resolution request over the network and consults a database of formerly resolved domain names (i.e., former conversions of domain names to network addresses) to determine if a mapping of a network address is locally available for the requested domain name to be resolved. If no network address is available locally within the DNS server associated with the client computer system, this DNS server operates as a DNS proxy server on behalf of the client computer system and uses a DNS protocol to propagate the domain name resolution request over the network to another (one or more) DNS server that may be capable of resolving the domain name into a network address. The DNS system (i.e., a collection of DNS servers operating one or more conventional DNS protocols) continues to propagate the domain name resolution request from DNS server to DNS server until a DNS server that receives the domain resolution request is reached that can successfully convert the domain name within the DNS request into an network address.

One technique for propagation of a domain name resolution request from one DNS server to another uses a message called a DNS CNAME response. A server can create a DNS CNAME response in reply to a domain resolution request. A DNS server can return a CNAME response, for example, to a client's DNS proxy server in order to specify another domain name server that the DNS proxy server should try in an attempt to resolve the requested domain name. In other words, if a DNS server receives a domain resolution request from a proxy server and cannot resolve the domain name into a network address, one type of response that this DNS server can return is a DNS CNAME response that identifies another domain name which the DNS proxy server should attempt to resolve in order to obtain a network address for the requesting client computer system. The use of DNS CNAME responses thus operates as a DNS redirection technique that allows a DNS server to reply to another DNS server, such as a DNS proxy server, with another alternative domain name to resolve instead of the domain name originally specified by the client.

A DNS server that is capable of resolving the domain name into a network address responds to a DNS request with a DNS address resolution response that contains the requested network address of the computer system for that domain name (e.g., the network address of a computer within the www.cisco.com domain). The DNS system then forwards or propagates this address resolution response over the network back to the DNS proxy server associated with the client computer system. The DNS proxy server then returns the requested network address back to the web browser operating within the client computer system. In addition, the DNS proxy server (and other DNS servers through which the address resolution response traveled on its way back to the client's DNS proxy server) can cache or store the mapping between the domain name and the network address for future use in the event that this same client or another client computer system requests resolution of this domain name in the future.

In this manner, the DNS system provides a system for mapping a domain name to a specific network address of a computer system associated with that domain name. Upon receipt of the requested network address from the DNS proxy server, the web browser can forward a content request that contains the URL for the content onto the network using the resolved network address as a destination address for the content request.

When the web server having that network address receives the content request containing the particular URL for the content, in some cases the web server will obtain the requested content and will provide a content response containing the content over the network back to the web browser operating within the client computer system. In this manner, the web browser can present the content to the user. In some situations however, a web server may determine, for various reasons, that it should not be the web server that provides the requested content to the web browser. Perhaps load balancing issues indicate to the web server that receives the content request that this server is heavily loaded (or is operating as a load balancer) and thus the content request should be redirected to another web server. In such cases, the web server that receives the original content request, such as an HTTP GET request, can redirect the web browser to another web server from which to obtain the content by responding to the initial content request with an HTTP redirect response. The HTTP redirect response can specify an alternative URL which the web browser is to use in order to obtain the requested content. When a web browser receives such a redirect response, it performs the processing explained above on the new URL specified within the redirect response in order to again attempt to obtain the content. This may involve performing another domain name resolution for a domain name specified in the redirected URL prior to transmitting a new content request for the redirected URL.

In this manner, one web server (or another network device such as a load balancer) can redirect content requests to other web servers (or to other network devices such as web caches). This redirection is generally transparent to the user of the web browser and can take place more than once until a particular web server determines that it will serve the requested content back to the web browser. At this point, the web browser receives the content and provides it to the user.

Another conventional technology related to the present invention relates to content distribution networks. Generally, a content distribution network or CDN is a collection of computer systems (e.g., web servers) that are capable of providing content to client computer systems. The various portions of content may be related in some manner, such as being provided by a single content provider. A CDN typically includes one or more content routers and one or more content engines that operate as servers (e.g., web servers) to serve content requested by content requests sent from client computer systems. A content router decides which content engine is to service particular requests for content.

As an example of the operation of a CDN, a user controlling a web browser operating on a client computer system may select a URL that references content served by a content engine within a CDN. The domain name specified in the URL might generally reference the CDN itself, such as www.CDN.com. When the web browser uses DNS to resolve this domain name, the content router associated with the CDN can operate as a DNS server on behalf of this CDN domain. As such, when the content router receives, via the DNS system, a domain resolution request to resolve the domain name www.CDN.com into a network address, the content router can select a network address of a specific content engine within the CDN based on routing criteria such as load balancing considerations between the various content engines that might be available to service a content request for content associated with this domain. The CDN content router can select and return the network address of the selected content engine associated with that CDN to the web browser. As explained above, the web browser can then proceed to access the requested content from that content engine (e.g., operating as a web server) using a protocol such as HTTP.

Some content distribution networks may have large amounts of content that must be distributed for access by clients over a computer network such as the Internet. In addition, organizations that provide CDNs might have limited computing system resources available for serving such content. Accordingly, network engineers have developed systems that allow "content peering" between two or more CDNs. Generally, content peering allows two or more CDNs to share facilities (e.g., content routers and content engines) and to collectively serve the same content, referred to as peered content. In a typical peering relationship, one CDN called the primary CDN has content that its operator/owner to would like to make available to end users using content engines belonging to one or more other CDNs, called secondary CDNs. All CDNs (i.e., both primary and secondary) can benefit from this arrangement since the primary can provide a better distribution outlet for content provided by content providers (i.e., customers of the primary CDN) while the secondary CDNs can make additional content easily and quickly accessible to customers of the secondary CDN, which are the end users or subscribers at client computer systems.

Two or more CDNs in a peering relationship typically adhere to a peering policy or peering service level agreement that indicates how each CDN is to peer content. As an example, the peering agreement or relationship may indicate that either CDN (i.e., the primary or any of the secondary) can have the right to terminate the peering relationship at any time without gaining permission from the other CDNs. This termination might be complete such that the entire peering relationship ends and thus a secondary CDN need not peer content for the primary, or only certain content may no longer be peered by a secondary CDN in which case this secondary CDN can continue to peer and serve other content on behalf of the primary CDN. The peering policy can also govern such things as billing and volume tracking criteria for content, bandwidth requirements, and the like.

SUMMARY OF THE INVENTION

Conventional techniques for handling content peering between primary and secondary CDNs suffer from certain deficiencies. As an example, consider a situation in which a secondary CDN determines that it is no longer willing to be in a peering relationship with a primary CDN. As a result of this decision, conventional operation of the secondary CDN allows this CDN to immediately stop handling content requests for peered content which it no longer serves or peers. However, since client computer systems and/or their associated DNS proxy servers may have previously resolved a domain name associated with peered content to a network address of a content engine within the secondary CDN which is no longer peering this content, this secondary content engine will continue to receive requests for the peered content. In other words, after a secondary CDN operates in a peering relationship with a primary CDN for a period of time, there may be web browsers running on client computer systems that have been instructed (via DNS domain name resolution) to obtain the no longer peered content from content engines within the secondary CDN.

This can be burdensome on the secondary CDN since receiving and rejecting content requests can consume processing resources. In addition, the behavior of the secondary CDN, which is no longer peering content associated with the primary CDN, is disruptive to the primary CDN's customers since the secondary content engines can simply drop the content requests, as they are no longer required to peer this content. In addition, since the secondary CDN has terminated the peering relationship, it would no longer be fair to require a secondary CDN to continually service content requests for peered content since there is no compensation (e.g., peering fees) being given to the secondary CDN.

Embodiments of the present invention provide a content peering approach that can operate between content distribution networks that significantly overcomes these and other difficulties. In particular, embodiments of the present invention provide mechanisms and techniques for processing domain name resolution requests and content requests between peered content distribution networks such that a primary content distribution network is able to determine a state of a peering relationship between itself and a secondary content distribution network. In addition, embodiments of the invention allow terminated or changed peering relationships between CDNs to be gracefully handled without significant disruption to CDN customers and operations. To achieve this, embodiments of the invention provide a unique set of domain name service configurations and request/response operations implemented within primary and secondary content distribution networks that share (or that formerly shared) a peering relationship.

Generally, and as will be explained in more detail, example embodiments of the invention allow content routers within a primary CDN and secondary CDN(s) to be configured to receive and respond to domain resolution requests for different domain names. Based upon the domain name specifications indicated within domain resolution requests presented to the primary and secondary content routers, these content routers can determine the identity and peering status of the originator of the content request (that caused a domain resolution request to be generated) when that originator is another CDN (e.g., a secondary peering CDN) that refuses to serve content.

As a brief example, a primary content router operating within a primary CDN can receive domain resolution requests containing an "original" domain specification, generally referred to herein as "DNS-O". This original domain specification DNS-O may have been specified within a URL referenced by a client computer system. The primary content router in the primary CDN may determine (e.g., for content routing reasons) that a secondary CDN should handle serving content associated with this original domain name specification based on a peering policy or relationship. In such situations where a determination based on the peering policy indicates that a content request should be serviced by a secondary CDN (e.g., by a secondary content engine associated with the secondary CDN), the primary content router in embodiments of this invention is configured to respond to original domain name resolution requests (that are to be redirected to another CDN) with a special "forward" domain specification, generally referred to herein as "DNS-F", that is uniquely associated with that secondary CDN. As a specific example, in response to the DNS-O resolution requests, the primary content router can make a decision based on a peering policy that a secondary CDN should handle a content request associated with the original domain resolution request (i.e., DNS-O) and can provide a DNS CNAME response containing a specific DNS-F back to the DNS proxy server associated with the client computer system. The primary content router can select the specific DNS-F from a group of forward domain specifications (multiple DNS-Fs) that are each respectively associated with specific secondary CDNs that peer content on behalf of the primary CDN.

As a result of this, the client's DNS proxy server will attempt to resolve the special forward domain specification DNS-F by preparing and forwarding a "forward" domain resolution request (containing DNS-F) to a secondary content router associated with a secondary (i.e., peering) CDN that can resolve (via the DNS system protocol) addresses associated with that forward domain specification DNS-F. A secondary content router operating within the secondary CDN receives the "forward" domain resolution request containing DNS-F. If the secondary content router is peering content associated with this forward domain specification, the secondary content router will select a content engine within the secondary CDN and will return an address resolution response to the client's DNS proxy server that can be used to identify the selected content engine. As an example, the address resolution response might contain an IP address of, or a name service record associated with, the selected content engine in the secondary CDN.

If the secondary CDN is no longer is peering content on behalf of the primary CDN, either because the peering relationship has been terminated or changed, or possibly because this secondary CDN does not have access to content, or because of a peering policy change, or for some other reason (i.e., it is overloaded), the secondary content router can respond to the forward domain resolution request (the DNS-F request) with an "alternative" domain resolution response. In one embodiment of the invention, the secondary content router can select another peering CDN that might be able to process a content request associated with the first forwarded domain resolution request. In doing so, the secondary content router can reply to the first forward domain resolution request with a second forward domain resolution response containing another forward domain specification (e.g., DNS-F2) of yet another CDN that might be capable of processing the content request. In other words, in one embodiment of the invention, if a secondary peering CDN receives a DNS resolution request containing a first DNS-F (i.e., a forward domain specification associated with this secondary CDN), and, based on a policy decision determines that a content request associated with this CDN is not to be handled or processed locally, then this content router can prepare an alternative domain resolution response containing another DNS-F associated with another secondary CDN. This may be done using another CNAME response containing DNS-FN (where N represents another secondary CDN). As such, such embodiments of the invention essentially allow CDNs to use a peering policy to make forwarding decisions and use specific forward domain specifications assigned to each secondary CDN to redirect domain resolution requests to other peering CDNs.

In other embodiments of the invention, an alternative domain resolution response sent from a secondary peering content router can contain a "reflected" domain specification (as opposed to the forward domain specification discussed in the above example embodiment), generally referred to herein as a "DNS-R", that is associated with the CDN in which the secondary content router operates (e.g., the CDN that is no longer peering, has some problem, or that has changed the peering terms of the peering relationship). The primary CDN is responsible for resolving reflected domain specifications. In other words, in some cases, instead of providing a forward domain resolution response containing a DNS-F, the secondary content router can provide a DNS CNAME response containing DNS-R back to the DNS proxy server associated with the client computer system. This is generally referred to herein as "reflecting" the content request (or reflecting the domain resolution request) back to the primary CDN.

According to embodiments of the invention, the primary content router in the primary CDN is configured to indicate or advertise to the DNS service that it is capable of resolving all "reflected" domain specifications (i.e., all DNS-Rs, in addition to the original domain specification DNS-O). Because of this, the DNS proxy server associated with a client computer system will forward a "reflected" domain resolution request containing the reflected domain specification DNS-R2 back to the primary content router. Upon receipt, the primary content router can thus, for example, determine that the secondary CDN that is uniquely associated with this reflected domain specification is no longer peering content (or has changed the peering relationship in some manner) on behalf of the primary CDN, or that it is experiencing a problem.

Since each secondary CDN can be configured to respond with a unique reflected domain resolution response containing a reflected domain specification associated with this secondary CDN in the event that a peering relationship has changed or that a content router or a content engine within this CDN is unable or unwilling to serve an address of a content engine within the CDN (in the case of a secondary content router) or the content itself (in the case of the content engine as discussed below) from this secondary CDN, or for any other reason, the primary CDN can keep track of secondary CDN peering policy and operation changes.

In addition, other embodiments of the invention allow a particular content engine, for example operating within a secondary content network, to determine that content requested in a content request cannot or should not be served back to the client computer system requesting such content. This can be done, for example, by allowing the secondary content engine to consult the peering policy to determine if peering is still active for the requested content or to determine if it should or should not serve this content. If the content engine determines (e.g., based on the peering relationship and policy) that it should serve the content, then it can provide a content response containing the request content.

In the alternative, the content engine may determine that this CDN should not serve the content. As a result of this determination, the secondary content engine can, depending upon different embodiments of the invention, either provide either a forward content response containing another forward domain specification (i.e., DNS-FN), or may alternatively provide a redirected and "reflected" content response back to the client computer system that contains the reflected domain specification (e.g., DNS-R2) associated with the secondary CDN in which the secondary content engine operates. In other words, as explained briefly above with respect to a content router in a secondary CDN, if a content engine is not going to serve the request content (based on a policy decision), the content engine can either provide a forward content response containing a DNS-FN to direct the content request to another secondary peering CDN, or can provide a reflected response containing a DNS-RN to reflect the request back to the primary CDN.

As an example of reflecting a content request back to the primary CDN, the secondary content engine can provide an HTTP redirect of the URL that it receives in a content request and can include a reflected domain specification DNS-R within this URL. Upon receipt by the client computer system of this redirected reflected content response, the client computer system must perform a resolution of the reflected domain specification DNS-R in the redirect response. To resolve this domain name DNS-R, the client computer system operates by forwarding the reflected domain specification DNS-R to its DNS proxy server which in turn forwards the reflected domain specification DNS-R back to the primary content router operating in the primary CDN. As explained above, the content router operating in the primary CDN "sees" this reflected domain specification DNS-R and is thus able to determine that a device operating with the particular secondary CDN associated with the reflected domain specification DNS-R (e.g., either a content router or a content engine) is not peering content.

As a result of these determinations, the primary content router can, for example, select a content engine within the primary CDN to process the content request associated with the reflected domain resolution request.

In this manner, embodiments of the invention provide a technique for rerouting content requests between peered CDNs and further provide a mechanism for the primary CDN to determine which secondary CDNs are peering content and which are not. Content routers and content engines configured according to embodiments of the invention can make content routing decisions based upon a peering policy that defines peering relationships between different content distribution networks. As will be explained herein, based upon unique domain name configurations that primary and peering content distribution networks can resolve, when a content router or content engine receives a domain resolution request or a content request, information concerning the domain name specification provided therein can provide insight into a history of attempts at servicing a content request.

Content engines configured according to embodiments of the invention can receive content requests that include a domain name specification. Content engines operating in secondary or peering content distribution networks can receive content requests that include a forward domain specification. Embodiments of the invention operating in such a content engine can consult a peering policy to determine such things as whether or not the policy indicates that the content distribution network associated with this content engine is peering the requested content, or whether the policy indicates that some other secondary peering content distribution network should handle the content request, or whether the peering relationship has been terminated and thus the content request should be reflected. In cases of an inactive or terminated peering relationship, the content engine may reflect content requests for a reflection continuation period. Any content requests received after expiration of the reflection continuation period cause an error response to be returned from the content engine to the requesting client.

In addition, embodiments of the invention provide various enhancements and alternative arrangements to the aforementioned description. As a brief example, assume a peering relationship has changed such that a secondary CDN is no longer peering content on behalf of a primary CDN. According to one embodiment of the invention, the secondary content router or content engine that receives a "forward" domain resolution request or a content request can consult peering relationship information in a peering policy to determine a reflection continuation period that indicates how long this CDN must continue to reflect domain resolution requests sent to a forward domain specification after changing the peering relationship, or how long it must redirect and reflect content requests in the case of content engine processing. This is referred to herein as a reflection continuation time or period. Generally, the peering policy sets forth a reflection continuation period that defines a time after an deactivation of the peering relationship that a secondary CDN is to continue to reflect requests for content (i.e., either content requests or domain resolution requests) on behalf of another CDN.

In this manner, if domain name servers such as a client computer system's DNS proxy server contain stale mappings of secondary CDN network addresses of secondary content engines mapped to a CDN domain name (e.g., DNS-F) that is no longer peering content on behalf of the primary CDN, or if the primary content router is unaware that the secondary CDN is no longer peering content (e.g., because no new requests for content have been received by the non-peering secondary CDN since the change in the peering relationship), and thus forwards a forward domain specification back to the DNS proxy which is then redirected to the secondary content router, the secondary content router can consult the reflection continuation period to determine whether it has expired. If it has not expired, then the secondary CDN should still provide a CNAME response containing a reflected domain specification associated with this secondary CDN. Otherwise it can return an error response. The reflection period can be used by content engines as well in order to "reflect" clients back to the primary content distribution network when the peering relationship has changed or ended such that the content engine no longer is required to peer requested content.

As an example, the reflection continuation period may specify a time of 24 hours after termination of the peering relationship during which a content router and content engines associated with the CDN for which the peering relationship has been terminated will still provide reflected domain name responses (for the content router) or reflected redirect content responses (in the case of a content engine). In this manner, client devices that contain "stale" DNS mappings to the secondary CDN that is no longer peering content can be "reflected" back to the primary CDN. In addition, the primary content router is made aware of the terminated peering relationship by the secondary CDN and is given another chance to reroute the reflected domain specification to one of its own content engines or to another secondary CDN that it believes is still peering the requested content.

Other embodiments provide a content router and/or a content engine, each comprising at least one communications interface, a memory, a processor and an interconnection mechanism coupling the communications interface(s), the memory and the processor. In the content router, the memory is encoded with an content routing application that when performed on the processor, produces a content routing process that causes the content router to process domain resolution requests by performing the processing steps outlined above and explained in detail here with respect to content routers. In the content engine, the memory is encoded with an content routing application that when performed on the processor, produces a content routing process that causes the content engine to process content requests by performing the processing steps outlined above and explained in detail here with respect to content engines.

The content router and content engine may be any type of data communications device, computerized device, or other device configured with software and/or circuitry to process and perform all of the method operations noted above and disclosed herein as embodiments of the invention. In other words, a computer, web server, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. More particularly, a computer program product is disclosed which has a computer-readable medium including computer program logic encoded thereon that, when executed on at least one processor with a computerized device such as a content router or content engine, causes the processor to perform the operations (e.g., the methods and processing steps) indicated herein that are considered embodiments of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a data communications device or other computing apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

Figure 1:
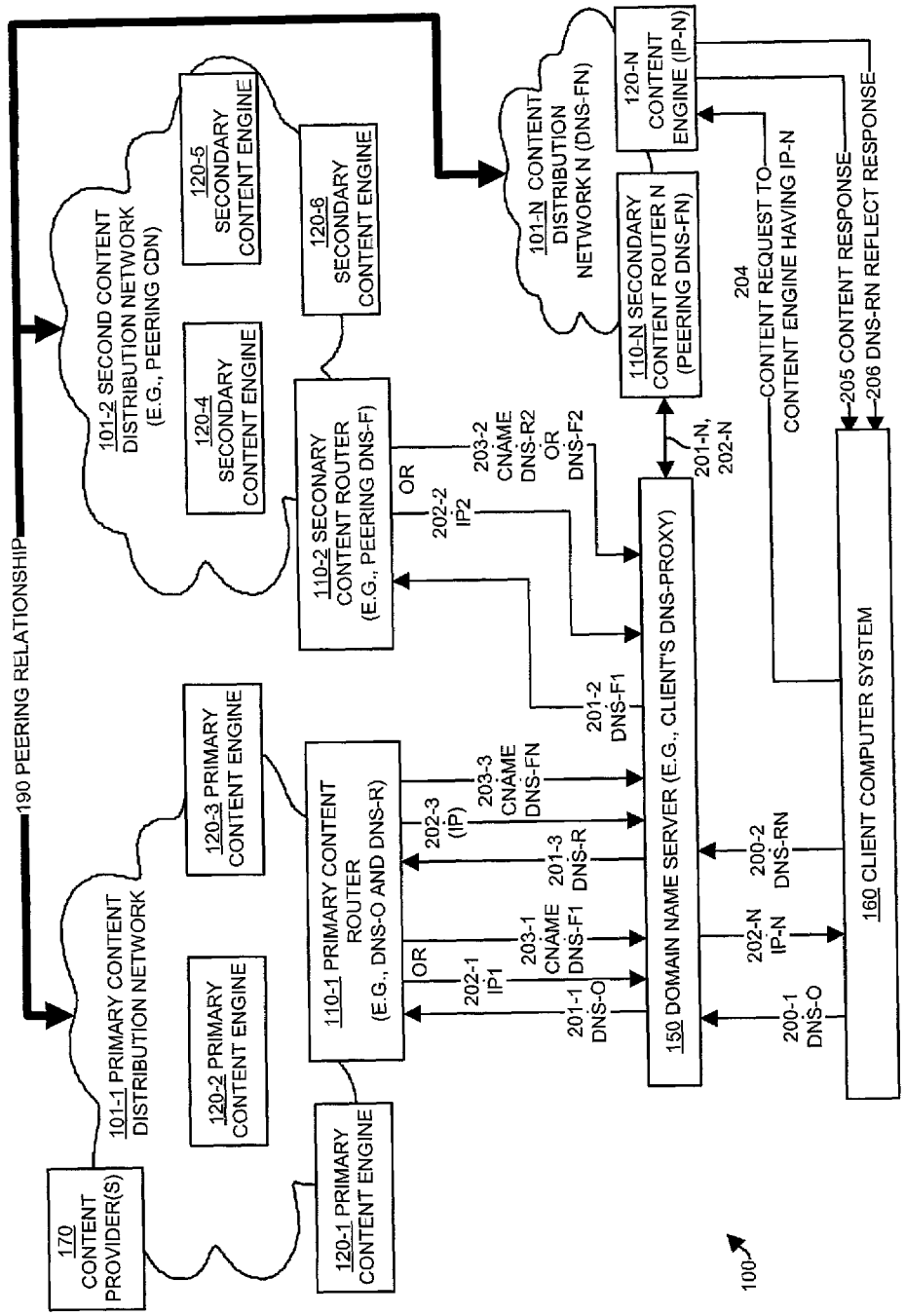
FIG. 1 illustrates an example of a networked computer environment which is suitable for use in explaining the operation of example embodiments of the invention.

Embodiments of the present invention provide mechanisms and techniques for processing domain name resolution requests and content requests between peered content distribution networks such that a primary content distribution network is able to determine a state of a peering relationship between itself and a secondary content distribution network. In addition, embodiments of the invention allow terminated or changed peering relationships between CDNs to be gracefully handled without significant disruption to CDN customers and operations. To achieve this, embodiments of the invention provide a unique set of domain name service configurations and request/response operations implemented within primary and secondary content distribution networks that share (or that formerly shared) a peering relationship.

Generally, and as will be explained in more detail, example embodiments of the invention allow content routers within a primary CDN and secondary CDN(s) to be configured to receive and respond to domain resolution requests for different domain names. Based upon the domain name specifications indicated within domain resolution requests presented to the primary and secondary content routers, these content routers can determine the identity and peering status of the originator of the content request (that caused a domain resolution request to be generated) when that originator is another CDN (e.g., a secondary peering CDN) that refuses to serve content.

As a brief example, a primary content router operating within a primary CDN can receive domain resolution requests containing an "original" domain specification, generally referred to herein as "DNS-O". This original domain specification DNS-O may have been specified within a URL referenced by a client computer system. The primary content router in the primary CDN may determine (e.g., for content peering reasons) that a secondary CDN should handle serving content associated with this original domain name specification based on a peering policy or relationship. In such situations where a determination based on the peering policy indicates that a content request should be serviced by a secondary CDN (e.g., by a secondary content engine associated with the secondary CDN), the primary content router in embodiments of this invention is configured to respond to original domain name resolution requests (that are to be redirected to another CDN) with a special "forward" domain specification, generally referred to herein as "DNS-F", that is uniquely associated with that secondary CDN. As a specific example, in response to the DNS-O resolution requests, the primary content router can make a decision based on a peering policy that a secondary CDN should handle a content request associated with the original domain resolution request (i.e., DNS-O) and can provide a DNS CNAME response containing a specific DNS-F back to the DNS proxy server associated with the client computer system. The primary content router can select the specific DNS-F from a group of forward domain specifications (multiple DNS-Fs) that are each respectively associated with specific secondary CDNs that peer content on behalf of the primary CDN.

As a result of this, the client's DNS proxy server will attempt to resolve the special forward domain specification DNS-F by preparing and forwarding a "forward" domain resolution request (containing DNS-F) to a secondary content router associated with a secondary (i.e., peering) CDN that advertises itself (via the DNS system protocol) as being able to resolve addresses associated with that forward domain specification DNS-F. A secondary content router operating within the secondary CDN receives the "forward" domain resolution request containing DNS-F. If the secondary content router is peering content associated with this forward domain specification, the secondary content router will select a content engine within the secondary CDN and will return an address resolution response to the client's DNS proxy server that can be used to identify the selected content engine. As an example, the address resolution response might contain an IP address of, or a name service record associated with, the selected content engine in the secondary CDN.

If the secondary CDN is no longer is peering content on behalf of the primary CDN, either because the peering relationship has been terminated or changed, or possibly because this secondary CDN does not have access to content, or because of a peering policy change, or for some other reason (i.e., it is overloaded), the secondary content router can respond to the forward domain resolution request (the DNS-F request) with an "alternative" domain resolution response. In one embodiment of the invention, the secondary content router can select another peering CDN that might be able to process a content request associated with the first forwarded domain resolution request. In doing so, the secondary content router can reply to the first forward domain resolution request with a second forward domain resolution response containing another forward domain specification (e.g., DNS-F2) of yet another CDN that might be capable of processing the content request. In other words, in one embodiment of the invention, if a secondary peering CDN receives a DNS resolution request containing a first DNS-F (i.e., a forward domain specification associated with this secondary CDN), and, based on a policy decision determines that a content request associated with this CDN is not to be handled or processed locally, then this content router can prepare an alternative domain resolution response containing another DNS-F associated with another secondary CDN. This may be done using another CNAME response containing DNS-FN (where N represents another secondary CDN). As such, such embodiments of the invention essentially allow CDNs to use a peering policy to make forwarding decisions and use specific forward domain specifications assigned to each secondary CDN to redirect domain resolution requests to other peering CDNs.

In other embodiments of the invention, an alternative domain resolution response sent from a secondary peering content router can contain a "reflected" domain specification (as opposed to the forward domain specification discussed in the above example embodiment), generally referred to herein as a "DNS-R", that is associated with the CDN in which the secondary content router operates (e.g., the CDN that is no longer peering, has some problem, or that has changed the peering terms of the peering relationship). The primary CDN is responsible for advertising that it can resolve reflected domain specifications. In other words, in some cases, instead of providing a forward domain resolution response containing a DNS-F, the secondary content router can provide a DNS CNAME response containing DNS-R back to the DNS proxy server associated with the client computer system. This is generally referred to herein as "reflecting" the content request (or reflecting the domain resolution request) back to the primary CDN.

According to embodiments of the invention, the primary content router in the primary CDN is configured to indicate or advertise to the DNS service that it is capable of resolving all "reflected" domain specifications (i.e., all DNS-Rs, in addition to the original domain specification DNS-O). Because of this, the DNS proxy server associated with a client computer system will forward a "reflected" domain resolution request containing the reflected domain specification DNS-R2 back to the primary content router. Upon receipt, the primary content router can thus, for example, determine that the secondary CDN that is uniquely associated with this reflected domain specification is no longer peering content (or has changed the peering relationship in some manner) on behalf of the primary CDN, or that it is experiencing a problem.

Since each secondary CDN can be configured to respond with a unique reflected domain resolution response containing a reflected domain specification associated with this secondary CDN in the event that a peering relationship has changed or, that a content router or a content engine within this CDN is unable or unwilling to serve an address of a content engine within the CDN (in the case of a secondary content router) or the content itself (in the case of the content engine as discussed below) from this secondary CDN, or for any other reason, the primary CDN can keep track of secondary CDN peering policy and operation changes.

In one example arrangement, during establishment of the peering relationship between primary and secondary (i.e., peering) content distribution networks, each exchanges those domain names that it is willing to serve. As an example, the primary content distribution network can provide to each secondary any reflected domain names that the secondary content distribution networks can use to reflect requests back to the primary. Likewise, the secondary content distribution networks can provide a list of forward domain name specifications to each other to indicate those forward domain names that each secondary content distribution network is willing to serve. The list of domain name specification can include multiple forward and reflected domain names. As an example, a single content distribution network can indicate multiple forward domain specifications that are to be used by other content distribution networks (either the primary or other secondary content distribution networks) when forwarding requests to this secondary content distribution network. Each can indicate a domain name history that can indicate, for example, how many times a request is forwarded or reflected to or from a content distribution network. This may be important if techniques used to provide domain resolution request attempts between content distribution networks have limitations on how many times such attempts can be made.

As an example, domain resolution request attempts can be performed using a CNAME response within the DNS system. The use of CNAME responses may be limited, for example, to five attempts to resolve an address. Thus, if a primary content distribution network receives an original domain specification and decides to forward this to a secondary content distribution network according to the techniques explained herein, the primary content router can use a first CNAME attempt (referred to herein as a "hop") for forwarding the request to a secondary content distribution network. The primary content router can select a first forward domain specification associated with that secondary peering content distribution network that indicates this is a first forwarding attempt. There can be other forward domain names selected by that secondary network (provided during establishment of the peering relationship) that can be used for second, third, fourth, etc. forwarding attempts. Accordingly, when the secondary receives this first forwarded request, it can deduce from the domain name itself that this is the first time this request is forwarded. This secondary may then determine, for example, that the request should be forwarded again to another secondary peering content distribution network. As such, the secondary can select a second forward domain specification associated with this other secondary network. Thus, when this "second" secondary network receives this second forward domain specification, it can determine that this is the second time this request is being forwarded.

To this end, each content distribution network can provide a list of first, second, third, fourth, fifth, etc. forward domain specifications to each other and the primary can provide a list of first, second, third, etc. reflect domain specifications. If a secondary needs to reflect back to the primary, that secondary can chose an appropriate reflect domain specification that indicates how many times the request has "hopped" from network to network. Thus, the primary can, for example, determine if the CNAME forwarding threshold or limit is being approached and can act accordingly.

In addition, other embodiments of the invention allow a particular content engine, for example operating within a secondary content network, to determine that content requested in a content request cannot or should not be served back to the client computer system requesting such content. This can be done, for example, by allowing the secondary content engine to consult the peering policy to determine if peering is still active for the requested content or to determine if it should or should not serve this content. If the content engine determines (e.g., based on the peering relationship and policy) that it should serve the content, then it can provide a content response containing the requested content.

In the alternative, the content engine may determine that this CDN should not serve the content. As a result of this determination, the secondary content engine can, depending upon different embodiments of the invention, either provide either a forward content response containing another forward domain specification (i.e., DNS-FN), or may alternatively provide a redirected and "reflected" content response back to the client computer system that contains the reflected domain specification (e.g., DNS-R2) associated with the secondary CDN in which the secondary content engine operates. In other words, as explained briefly above with respect to a content router in a secondary CDN, if a content engine is not going to serve the request content (based on a policy decision), the content engine can either provide a forward content response containing a DNS-FN to direct the content request to another secondary peering CDN, or can provide a reflected response containing a DNS-RN to reflect the request back to the primary CDN.

As an example of reflecting a content request back to the primary CDN, the secondary content engine can provide an HTTP redirect of the URL that it receives in a content request and can include a reflected domain specification DNS-R within this URL. Upon receipt by the client computer system of this redirected reflected content response, the client computer system must perform a resolution of the reflected domain specification DNS-R in the redirect response. To resolve this domain name DNS-R, the client computer system operates by forwarding the reflected domain specification DNS-R to its DNS proxy server which in turn forwards the reflected domain specification DNS-R back to the primary content router operating in the primary CDN. As explained above, the content router operating in the primary CDN "sees" this reflected domain specification DNS-R and is thus able to determine that a device operating with the particular secondary CDN associated with the reflected domain specification DNS-R (e.g., either a content router or a content engine) is not peering content.

As a result of these determinations, the primary content router can, for example, select a content engine within the primary CDN to process the content request associated with the reflected domain resolution request.

In this manner, embodiments of the invention provide a technique for rerouting content requests between peered CDNs and further provide a mechanism for the primary CDN to determine which secondary CDNs are peering content and which are not. Content routers and content engines configured according to embodiments of the invention can make content routing decisions based upon a peering policy that defines peering relationships between different content distribution networks. As will be explained herein, based upon unique domain name configurations that primary and peering content distribution networks can resolve, when a content router or content engine receives a domain resolution request or a content request, information concerning the domain name specification provided therein can provide insight into a history of attempts at servicing a content request.

Content engines configured according to embodiments of the invention can receive content requests that include a domain name specification. Content engines operating in secondary or peering content distribution networks receive content requests that include a forward domain specification. Embodiments of the invention operating in such a content engine can consult a peering policy to determine such things as whether or not the policy indicates that the content distribution network associated with this content engine is peering the requested content, or whether the policy indicates that some other secondary peering content distribution network should handle the content request, or whether the peering relationship has been terminated and thus the content request should be reflected. In cases of an inactive or terminated peering relationship, the content engine may reflect content requests for a reflection continuation period. Any content requests received after expiration of the reflection continuation period cause an error response to be returned from the content engine to the requesting client.

In addition, embodiments of the invention provide various enhancements and alternative arrangements to the aforementioned description. As a brief example, assume a peering relationship has changed such that a secondary CDN is no longer peering content on behalf of a primary CDN. According to one embodiment of the invention, the secondary content router or content engine that receives a "forward" domain resolution request or a content request can consult peering relationship information in a peering policy to determine a reflection continuation period that indicates how long this CDN must continue to reflect domain resolution requests sent to a forward domain specification after changing the peering relationship, or how long it must redirect and reflect content requests in the case of content engine processing. This is referred to herein as a reflection continuation time or period. Generally, the peering policy sets forth a reflection continuation period that defines a time after an deactivation of the peering relationship that a secondary CDN is to continue to reflect requests for content (i.e., either content requests or domain resolution requests) on behalf of another CDN.

In this manner, if domain name servers such as a client computer system's DNS proxy server contain stale mappings of secondary CDN network addresses of secondary content engines mapped to a CDN domain name (e.g., DNS-F) that is no longer peering content on behalf of the primary CDN, or if the primary content router is unaware that the secondary CDN is no longer peering a content (e.g., because no new requests for content have been received by the non-peering secondary CDN since the change in the peering relationship), and thus forwards a forward domain specification back to the DNS proxy which is then redirected to the secondary content router, the secondary content router can consult the reflection continuation period to determine whether it has expired. If it has not expired, then the secondary CDN should still provide a CNAME response containing a reflected domain specification associated with this secondary CDN. Otherwise it can return an error response. The reflection period can be used by content engines as well in order to "reflect" clients back to the primary content distribution network when the peering relationship has changed or ended such that the content engine no longer is required to peer requested content.

As an example, the reflection continuation period may specify a time of 24 hours after termination of the peering relationship during which a content router and content engines associated with the CDN for which the peering relationship has been terminated will still provide reflected domain name responses (for the content router) or reflected redirect content responses (in the case of a content engine). In this manner, client devices that contain "stale" DNS mappings to the secondary CDN that is no longer peering content can be "reflected" back to the primary CDN. In addition, the primary content router is made aware of the terminated peering relationship by secondary CDN and is given another chance to reroute the reflected domain specification to another content engine or to another secondary CDN that it believes is still peering the requested content.

FIG. 1 illustrates an example of a computing system environment 100 which is suitable for use in explaining operations of example embodiments of the invention. The computing system environment 100 includes a plurality of content distribution networks 101 that can operate in a peering relationship 190 with each other. In particular, secondary content distribution networks 101-2 through 101-N peer content on behalf of a primary content distribution network 101-1. In addition, the computing system environment 100 includes a client computer system 160 and a domain name server 150 that operates as a DNS proxy server on behalf of the client computer system 160 with respect to the content distribution networks 101.

The primary content distribution network 101-1 includes one or more content providers 170, a plurality (three in this example) of primary content engines 120-1 through 120-3, and a primary content router 110-1. The secondary content distribution network 101-2 includes a plurality (also three in this example) of secondary content engines 120-4 through 120-6 as well as a secondary content router 110-2. Likewise, one or more other content distribution networks such as content distribution network 101-N include at least one secondary content router 110-N and one or more content engines 120-N. Generally, the content providers 170 within the primary content distribution network 101-1 provide and distribute content to the various content engines 120. The content engines 120 generally operate as web server computer systems and are capable of serving content provided and distributed by the content providers 170 or by peering distribution mechanisms outside of the scope of this invention. The content routers 110 generally operate as domain name server (DNS) computer systems that can resolve domain name resolution requests into network addresses of specific content engines for domain name specification associated with that content router's 110 content distribution network 101.

In this example, the content distribution networks or CDNs 101 are in a peering relationship 190 with each other. Generally, for purposes of these example explanations, this means that all or portions of a domain of content provided by the content providers 170 is/are distributed between the various content engines 120 in each of the CDNs 101. As a result of this peering relationship 190, all or a subset of content associated with a domain name might be obtainable by (i.e., servable from) content engines 120 in both the primary content distribution network 101-1 as well as in one or more of the secondary content distribution networks 101-1 through 101-N. The peering relationship 190 is governed by a peering policy which each of the components within each CDN 101 can access. Accordingly, a content request for content from the client computer system 160 might be re-directable, as will be explained herein, to different content engines 120 within the different content distribution networks 101 using redirection techniques within protocols such as HTTP and DNS. It is to be understood that the primary content distribution network 101-1 serves a particular hosted domain of data or content, and that all or a portion of this hosted domain content is also served by the secondary content distribution networks 101-2 through 101-N that peer the primary CDN 101-1.

The various messages exchanged between the client computer system 160, the domain name server 150 and the various content routers 110 and content engines 120 as illustrated in FIG. 1 will now be generally explained with respect to the numbers given to each of these messages. In addition, the operation of the content routers 110 in processing the messages illustrated in FIG. 1 will be explained in conjunction with the processing steps shown in FIG. 2.

Beginning with the client computer system 160, a user of the client 160 desires to access content referenced by a URL such as http://DNS-O/content.htm. In doing so, the client computer system 160 requires that the original domain name specification of the hosted domain (i.e., DNS-O) first be resolved with the domain name server 150 which operates as that client's DNS proxy server. Accordingly, the client computer system 160 sends a client domain resolution request message 200-1 containing the original domain name DNS-O to the domain name server 150. The original domain name DNS-O can only be resolved by the primary content router 110-1. As a result, the domain name server 150 forwards an original domain resolution request 201-1 containing the original domain specification DNS-O to the primary content router 110-1.

Figure 2:
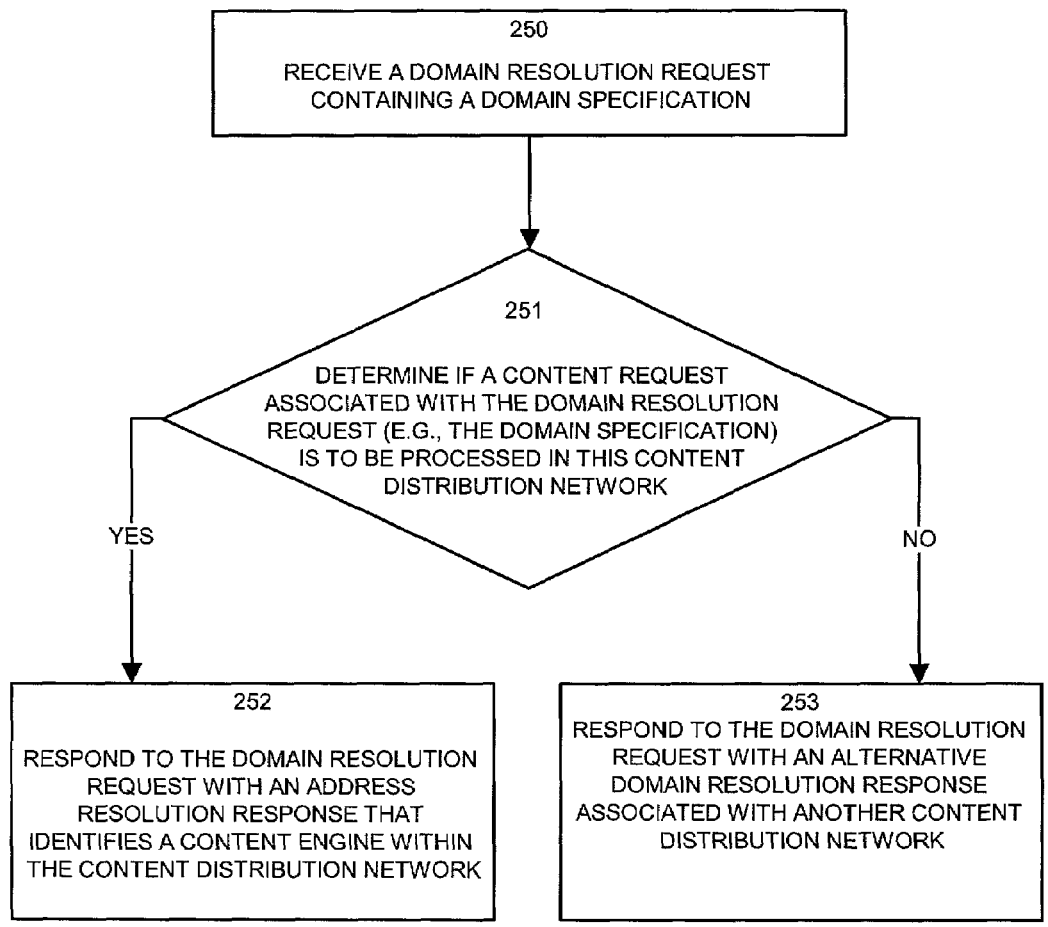
FIG. 2 is a flow chart of processing steps performed by content routers configured according to one embodiment of the invention.

Referring now to step 250 in FIG. 2, the primary content router 110-1 operates to receive the domain resolution request 201-1 containing a domain specification, which in this case is the original domain specification DNS-O.

Next, in step 251, the primary content router 110-1 determines if a content request associated with the domain resolution request 201-1 (i.e., content associated with the original domain specification DNS-O) is to be processed in or by this content distribution network 101-1. In other words, in step 251, the primary content router 110-1 determines if a content engine 120-1 through 120-3 can be identified within CND 101-1 that is a good choice for serving content associated with this original domain specification based on a peering policy. If a content request associated with the domain resolution request 201-1 is to be processed by the content distribution network 101-1 (i.e., from a specific content engine 120-1 through 120-3), then processing proceeds to step 252.

In step 252, the primary content router 110-1 responds to the original domain resolution request 201-1 with an address resolution response 202-1 that identifies a content engine 120 (i.e., one of 120-1 through 120-3) within the content distribution network 101 (101-1 for the primary content router) to which this content router 110-1 is associated. In other words, if content associated with the original domain specification DNS-O should be served from a content engine 120-1 through 120-2 operating within the primary content distribution network 101-1, then the primary content router 110-1 will respond with a response that identifies a particular primary content engine 120 selected to serve the content for this domain. As illustrated in FIG. 1, the example address resolution response 202-1 is labeled "IP1" to indicate that, in this example, in IP address of a primary content engine 120-1 through 120-3 is returned to the domain name server 150 (e.g., via a domain name service record).

Returning attention back to step 251, in the alternative, if a content request associated with the original domain resolution request 201-1 is not to be processed by the content distribution network 101-1, then processing proceeds to step 253.

In step 253, the primary content router 110-1 responds to the domain resolution request 201-1 within an alternative domain resolution response 203-1 associated with another content distribution network 101. In particular, for the primary content router 110-1, this alternative domain resolution response 203-1 is a "forward" domain resolution response containing a forward domain specification DNS-F that is associated with one of the other secondary content distribution networks 101-2 through 101-N that might be capable of peering the content associated with the original domain specification. The alternative domain resolution response 203-1 may be a DNS CNAME forward domain name response containing DNS-F. A particular secondary content router 110 within one of the secondary content distribution networks 101-2 through 101-N is configured within the DNS system to resolve the selected forward domain specification DNS-F.

As a result of this processing by the primary content router 110-1, the DNS proxy domain name server 150 receives the forward domain resolution response 203-1 instead of the network address response 202-1. As such, the domain name server 150 must resolve the forward domain name specification DNS-F into a network address in order to return a network address to the client computer system 160. Assume for this example that the secondary content router 110-2 associated with the secondary CDN 101-2 is capable (i.e., advertises), within the DNS system, of resolving the forward domain name specification www.dns-f.com. In other words, this particular forward domain name specification DNS-F is associated with only the secondary CDN 101-2 in this example. The domain name server 150 thus prepares and forwards a forward domain resolution request 201-2 to the secondary content router 110-2.

Within the secondary content router 110-2, processing also proceeds according to the steps shown in the flow chart in FIG. 2, with only minor variations.

In step 250, the secondary content router 110-2 receives the forward domain resolution request 201-2 containing the forward domain specification DNS-F for resolution into a network address.

Next, in step 251, the secondary content router 110-2 determines if a content request associated with the domain resolution request 201-2 (i.e., content associated with the forward domain specification www.dns-f.com) is to be processed by the content distribution network 101-2. The secondary content router 110-2 thus determines if a secondary content engine 120-4 through 120-6 can be identified that is either available or capable of serving content associated with this domain specification. This decision can be based on a peering policy based on characteristics such as the IP address of the client's proxy DNS server 150 that is providing this DNS-F resolution request to make a determination if a content request is to be processed in this content distribution network. The secondary content router 110-2 may also make this determination based on whether or not a peering relationship 190 is still active between the primary CDN 101-1 and the secondary CDN 101-2, or may use any other peering policy criteria in making this decision. If a content request associated with the forward domain resolution request 201-2 is to be processed by the content distribution network 101-2 (i.e., by a specific content engine 120-4 through 120-6), then processing proceeds to step 252 at which point an address of a content engine is provided.

In step 252, the secondary content router 110-2 responds to the forward domain resolution request 201-2 with an address resolution response 202-2 that identifies a content engine 120 (i.e., one of 120-4 through 120-6) within the content distribution network 101-1 to which this content router 110-2 is associated. In other words, if content associated with the forward domain specification DNS-F should be served (i.e., based on a peering policy) from a content engine 120-4 through 120-6 operating within the secondary content distribution network 101-2, then the secondary content router 110-2 will respond with the name service record or a network address of a particular secondary content engine 120 selected to serve the content for this domain. As illustrated in FIG. 1, the address resolution response 202-2 is labeled "IP2" to indicate that, in this example, in IP address of a secondary content engine 120-4 through 120-6 is returned to the domain name server 150.

Returning attention back to step 251, in the alternative, if content associated with the forward domain resolution request 201-1 is not available from the peering content distribution network 101-2, then processing proceeds to step 253. This may be the case, for example, if the secondary content distribution network 101-2 has terminated the peering relationship 190 or if the content is not yet available in this CDN 101-2.

In step 253, the secondary content router 110-2 also responds to the forward domain resolution request 201-1 within an alternative domain resolution response 203-2 associated with another content distribution network. In particular, for the secondary content router 110-2 (or any other secondary content router in any other secondary peering content distribution network 101-2 through 101-N), according to one embodiment of the invention, the alternative domain resolution response 203-2 is a "reflected" domain resolution response containing a reflected domain specification DNS-R2 that is associated only (in this example) with the secondary content distribution network 101-2, as opposed to a forward domain resolution response (as performed by the primary in the first iteration of FIG. 2). That is, in one configuration, when the secondary content router 110-2 determines for whatever reason that it is not going to resolve the forward domain specification DNS-F into a network address, it returns a DNS CNAME response containing a unique "reflected" domain name specification DNS-R2 that is uniquely associated with this particular secondary content distribution network 101-2.

In an alternative embodiment, which will be explained shortly, the secondary content router 110-2 can provide a forward domain resolution response 203 to yet another secondary content distribution network.

In the case of providing a reflected response by the secondary content router 110-2, the proxy domain name server 150 receives the reflected domain resolution response 203-2 (DNS-R2 in this example) instead of a network address response 202-2. As such, the domain name server 150 must resolve the reflected domain name specification DNS-R2 into a network address in order to return a network address to the client computer system 160. According to embodiments of the invention, the primary content router 110-1 is capable, within the DNS system, of resolving all reflected domain name specifications including the reflected domain name specification DNS-R2. In other words, in this particular embodiment, when any secondary content router 110-2 through 110-N reflects the domain name resolution request, it does so by providing a reflected domain name resolution response containing a reflected domain specification DNS-RN associated with content distribution network N and the primary content router 110-1 is capable of resolving that name.

As a result, the domain name server 150 must again retrieve a network address associated with this reflected domain specification DNS-R2 and thus prepares and forwards a reflected domain resolution request 201-3 to the primary content router 110-1, because the primary content router advertises itself as being able to resolve addresses associated with both the original and any reflected domain specifications, which is www.dns-r2.com in this example.

As illustrated in FIG. 1, the primary content router 110-1 can again repeat the processing illustrated in FIG. 2 as explained above in order to produce either an address resolution response 202-3 containing a network address of a particular selected content engine 120-1 through 120-3 from the primary CDN 101-1, or, alternatively, provides yet another forward domain resolution response 203-3 that identifies another secondary content router 110-N (other than ones already tried with formerly selected forward domain specifications). The domain name server 150 can again perform the exchange of messages indicated as 201-N and 202-N with other CDNs 101-N in order to finally obtain a network address resolution response 202-N from a secondary content router 110-N for the content engine 120-N in which the peering relationship is active and content is available for this forward domain.

In this manner, any secondary content distribution networks 101-2 through 101-N that terminate a peering relationship 190 or that for any other reason determine or desire not to serve content associated with their respective forward domain specifications can return, in this example embodiment, a reflected domain specification within a reflected domain resolution response that must be resolved by the primary content router 110-1 within the primary content distribution network 101-1. In receiving such a resolution request, the presence of the reflected domain name specification indicates to the primary content router 110-1 that the particular content distribution network associated with that reflected domain specification is, for some reason, no longer peering content on behalf of the primary CDN 101-1 or that content is not yet available at that secondary content distribution network In an alternative configuration as briefly noted above, instead of reflecting domain resolution requests when a secondary content router determines that it's content distribution network will not process a content request, the content router can select another forward domain specification DNS-FN, when N is the a number indicating another peering or secondary content distribution network. In this manner, a forward domain resolution request DNS-F1 from the primary content router can first be forwarded to a first secondary peering content distribution network serving DNS-F1 resolution requests, and if that secondary content distribution network determines that the content request associated with that first forward domain resolution request is to processed by another content distribution network (i.e., other then itself), then instead of reflecting, this secondary content router can chose a next successive forward domain specification (e.g., a second) DNS-F2 associated with yet another peering content distribution network. To this end, the domain resolution request can be forwarded until it is received by a content distribution network that determines, based on the peering policy, that it should process the associated content request (i.e., the forthcoming content request from the client that will arrive when the client is provided with an IP address of a content engine). One caveat to this and a solution to the caveat will be explained in detail below and involves a limitation on the number of times a DNS resolution request may be sent from device to device (i.e., via return to the client's DNS proxy and then being resent to another content router) using a DNS CNAME response.

Continuing with the example illustrated in FIG. 1, assume that the secondary content router 110-N operating within the secondary distribution network 101-N returns a resolved network address (e.g. in a DNS-A record) in the address resolution response 202-N for the content engine 120-N. As a result, the domain name server 150 receives or determines (from the name service record) the network address and provides or forwards the address resolution response 202-N containing the network address of the content engine 120-N back to the client computer system 160. Using this network address, the client computer system 160 forwards a content request 204 to the content engine 120-N having the network address IP-N. If the content engine 120-N decides to serve the content request in the content request 204, the content engine 120-N returns a content response 205 containing the requested content.

In the alternative, embodiments of the invention further allow content engines 120 which decline to provide or otherwise serve content in response to a content request 204 (for whatever reason) to provide a reflected redirect content response 206 back to a client computer system 160 containing a reflected domain name DNS-R which must be resolved by the client computer system 160. In particular, the reflected redirect response 206 contains the reflected domain specification DNS-RN associated with the content distribution network 101-N in which the content engine 120-N resides. As a result of this processing, the client computer system 160 performs another domain name resolution process on the reflected domain specification DNS-RN which results in the primary content router 110-1 again receiving a reflected domain specification associated with a particular secondary peering content distribution network 101-N that has declined to serve content. Accordingly, the primary content router 110-1 now realizes that this secondary content network 101-N is either no longer peering content associated with the reflected domain specification DNS-RN or that this content is not available in this secondary content distribution network. It is to be understood that the content router could forward the request instead of reflect.

The information related to whether or not a particular secondary content distribution network 101 is or is not still in a peering relationship 190 with the primary content distribution network 101-1 can allow the primary content router 110-1 to perform a number of corrective actions. As an example, the primary content router 110-1 will now stop forwarding requests to the secondary content distribution network 101-N.

One caveat with this example system involves a limitation present in conventional DNS systems on the number of times a resolution request can be forwarded, for example using CNAME requests. In particular, when performing multiple forwards or reflections followed by forwarding of resolution requests, or when performing multiple forwards in succession to each other, conventional DNS systems provide a limitation on how many times a particular domain resolution request can be re-routed using a CNAME response to another name server device for resolution into an address. For example, this limit might be five "hops" (i.e., five successive CNAME resolution attempts). Accordingly, embodiments of the invention that operate within content routers can chose and use certain specific names of the forward and/or the reflected domain resolution requests to determine how many times a particular domain resolution request associated with a content request has been forwarded (and/or reflected). This can be done, for example, by examining the specific reflected and/or forward domain specifications that indicate a domain resolution history.

As an example, if the CNAME "hop count" limit is five hops, then a resolution attempt sequence of an original domain name DNS-O (received at a primary content router, does not count towards the CNAME limit), followed by a first forward attempt to a first peering content router (DNS-F1, hop 1), followed by a first reflection (DNS-R1, hop 2) back to the primary (hop 2), followed by a second forward attempt (DNS-F2) (hop 3), and a final reflection to DNS-R2 (hop 4) would be allowed.

Note that in this particular example of forwarding then reflecting and then forwarding again and reflecting again, the primary would preferably not forward one last time (hop 5) even though the limit was not reached. This is because the secondary content distribution network would not be able to reflect back since the CNAME limit would thus be exceeded. In other words, for embodiments configured in this manner, the receipt of the second reflected domain resolution request by the primary content router indicates to this content router that the forwarding threshold CNAME limit has been reached and that an address resolution response must now be provided that references a content engine within the primary content distribution network.

In embodiments where each secondary content router is configured to forward resolution requests using DNS-FN (as opposed to reflecting) to another (i.e., a next successive) peering content distribution network (i.e., when a determination is made that a content request should be processed by the other content distribution network), a resolution attempt sequence comprising an original domain name DNS-O (received at a primary content router—does not count towards the CNAME hop count limit), followed by a first forward attempt to a first peering content router (DNS-F1, hop 1), followed by a second forward resolution attempt (DNS-F2, hop 2) to a second peering content distribution network, followed by a third forward resolution attempt (DNS-F3, hop 3) to a third peering content distribution network, followed by yet a final forward resolution attempt (DNS-F4, hop 4) is allowed. At the fourth peering content distribution network (i.e., at the content distribution network that is to resolve DNS-F4), this peering secondary content router can determine that the CNAME hop count is going to be reached on the next hop and, (assuming this device determines that the content request is not to be processed in this peering content distribution network) can choose to reflect the resolution request back to the primary content distribution network with a final DNS-R5 (indicating to the primary that no more hops are available). In this manner, a resolution request can be attempted at multiple peering content distribution networks and depending upon the peering policy in place in each, each can either reflect or forward based on an examination of the DNS specification that the content router is being asked to resolve.

According to embodiments of the invention, each content distribution network is capable of serving multiple forward domain specifications, such as DNS-F1-1, DNS-F1-2, DNS-F1-3, and so forth. Accordingly, when a peering content router in a content distribution network receives a forward domain specification originating from another source (e.g., from a primary content router or from another secondary content distribution network), the peering content router can determine, based on the forward domain specification, where this domain resolution request originated from and how many hops have taken place beforehand in an attempt to resolve an address for a content request. The content distribution network where the forwarded request came from can dynamically append a prefix to the domain name in order to indicate if the domain name is a forward (or reflected) domain and how many CNAME hops have transpired since the first forward or reflect operation. Should a peering content router decide to forward to yet another peering content distribution network, or decide to reflect, this content router can dynamically generate another forward domain specification of another content distribution network that indicates the next successive hop count for this sequence of name resolution attempts.

As an example, suppose a peering content distribution network such as cdn2.com receives a resolution request containing a domain name such as www.f1.cdn2.com. The "cdn2.com" in this request identifies the peering content distribution network and the "f1" prefix indicates that a device such as the primary content router in the primary content distribution network is selecting this particular forward domain specification to indicate that this is the first hop in a string or chain of name resolution attempts. If this peering content distribution network decides to forward this request again, it can select another forward domain specification for yet another peering content distribution network such as cdn3.com. An actual example might appears as "www.f2.cnd3.com" where the "cdn3.com" indicates another peering secondary content distribution network and the ".f2." indicates that this is a second CNAME resolution attempt (e.g., in a series of five allowable attempts). If the content router in this "cdn3.com" peering content distribution network determines that it is not going to process a content request associated with this domain specification, then the content router can select a next forward domain specification such as www.f3.cdn4.com of another (i.e., cdn4.com) peering content distribution network. The "f3" in this domain specification indicates that this is the third hop in the name resolution sequence. Assuming this process or sequence was to continue, at the third peering content distribution network "cdn4.com", the forward domain specification www.f4.cdn5.com could be selected for another forward attempt to indicate that the fourth attempt is being made at selecting a content engine. If the content router in that fourth peering content distribution network (cdn5.com) determines that this content distribution network is not to process a content request associated with the domain resolution request, then this peering content distribution network can reflect back to the primary using a domain name such as "www.r5.cdn1.com" since the fifth hop in name resolution attempts is the last possible attempt at selecting a content engine. In this example, "cdn1.com" represents the primary content distribution network and the "r5" portion of this domain name indicates that this is a reflected domain request and that five CNAME resolution attempts have been made.

In another example embodiment, when a content router in the primary content distribution network receives a reflected domain resolution request, the primary content router can determine if a content request associated with the reflected domain resolution request is to be processed by the first content distribution network. Since the number of allowable CNAME resolution attempts is limited (e.g., to five hops), the primary content router may not be able to forward the resolution request to yet another (e.g., a third) peering content distribution network if a forwarding threshold is met. As an example, if after receiving an original domain resolution request (DNS-O), the primary forwards to a first peering content distribution network (hop 1), then that first peering content distribution network reflects back to the primary (hop 2), and the primary chooses a second peering content distribution network via another forward (hop 3), and this secondary reflects back to the primary (hop 4), the primary can, at this point, determine, based on the domain resolution request history (i.e., the number of CNAME resolutions made thus far, as indicated by the current domain name attempting to be resolved, as selected by the most recent content distribution network using the CNAME technique to reflect), if a technique used to receive the reflected domain resolution request has reached a predetermined forwarding threshold. If so, the primary can determine that the content request associated with the domain resolution request is to be processed by the primary content distribution network and should not be again forwarded. If the CNAME limit is five (i.e., hops) but only four have been used, then if the primary were to again forward to yet another peering content distribution network (hop 5), the limit would be reached. However, in such cases, if the most recently chosen peering content distribution network could not process the resolution request for some reason, that peering content distribution network would not be able to again use CNAME to reflect, since the CNAME limit is reached. As such, in this example, the forwarding threshold is the CNAME hop count limit minus one, or four.

It is to be understood that the aforementioned configurations allow the primary content distribution network to provide unique and multiple reflection domain specifications to each peering content distribution network. Such domain names can indicate how many times the request has been sent from content distribution network to content distribution network and can also indicate the identity of the content distribution network that is sending the request.

In this manner, in embodiments that perform a forward and then reflect technique as explained above, each successive CNAME hop can select a domain name for the next hop (either a forward or reflected domain specification) that indicates how many hops have transpired thus far and that also identifies the network sending the forward or reflect request. As an example, during establishment of the peering relationship, the primary might send a list of reflect domain specification to a third peering content distribution network that appears as www.r1.cdn3.cdn1.com, www.r2.cdn3.cdn1.com, www.r3.cdn3.cdn1.com and so forth. Then, during operation, when the third content distribution network needs to reflect back to the primary content distribution network, a device in the third content distribution network (such as a content router or content engine) can select one of these reflect domain names such that the "rn" portion indicates how many CNAME attempts have been made thus far. The "cdn3" portion of these reflect domain names indicates to the primary content distribution network "cdn1.com" that the reflection is coming from the third peering content distribution network. This can beneficial in situations where multiple forwards between peering content distribution network end in a reflection back to the primary. This allows the primary to identify the last peering content distribution network to have attempted resolution of the request.

A technology related to this invention that discloses how domain names can be dynamically generated is disclosed in co-pending patent application having U.S. Ser. No. 10/093,579, filed Mar. 7, 2002, entitled "Methods and Apparatus for Redirecting Requests for Content", and assigned to the same assignee as the present invention, the entire teachings and contents of which are hereby incorporated by reference herein in their entirety. This technology can be used by the present invention to generate domain names on the fly in order to forward or reflect requests as disclosed herein.

Figure 3:
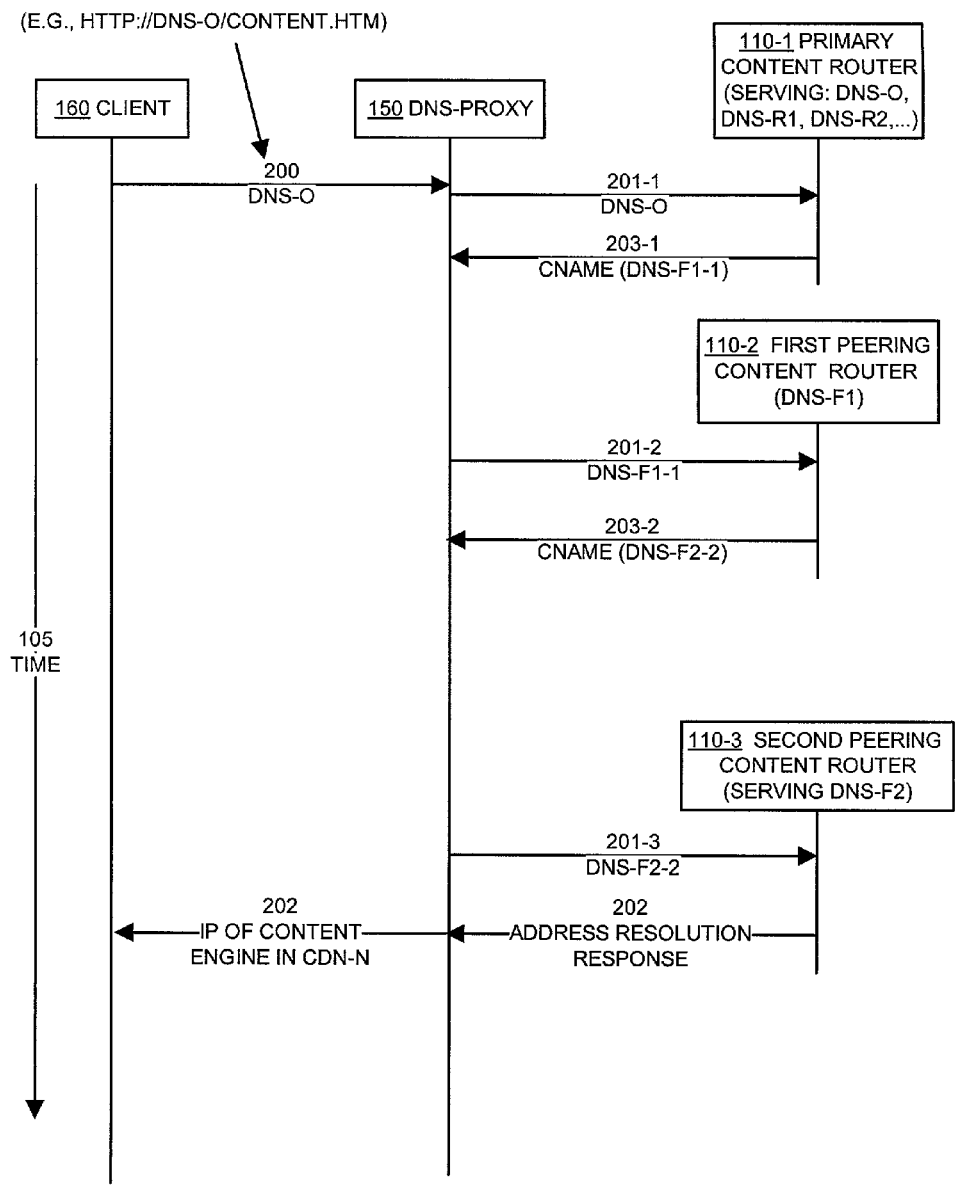
FIG. 3 illustrates an example of an exchange of messages as performed according to one embodiment of the invention to allow a client to obtain an address of a content engine within a group of peered content distribution networks.

FIG. 3 illustrates more detail concerning the exchange of messages according to a protocol such as explained above to allow a client computer system 160 to receive a network address of a content engine 120 in response to providing an original domain resolution request 200 to a DNS proxy server 150 associated with that client computer system 160. In particular, with respect to the illustration in FIG. 3, time progresses from top to bottom. Further details of the messages exchanged between the components illustrated in FIG. 3 will be explained with respect to the flow chart of processing steps of the primary and secondary content routers as illustrated in FIGS. 4 and 5.

Figure 4:
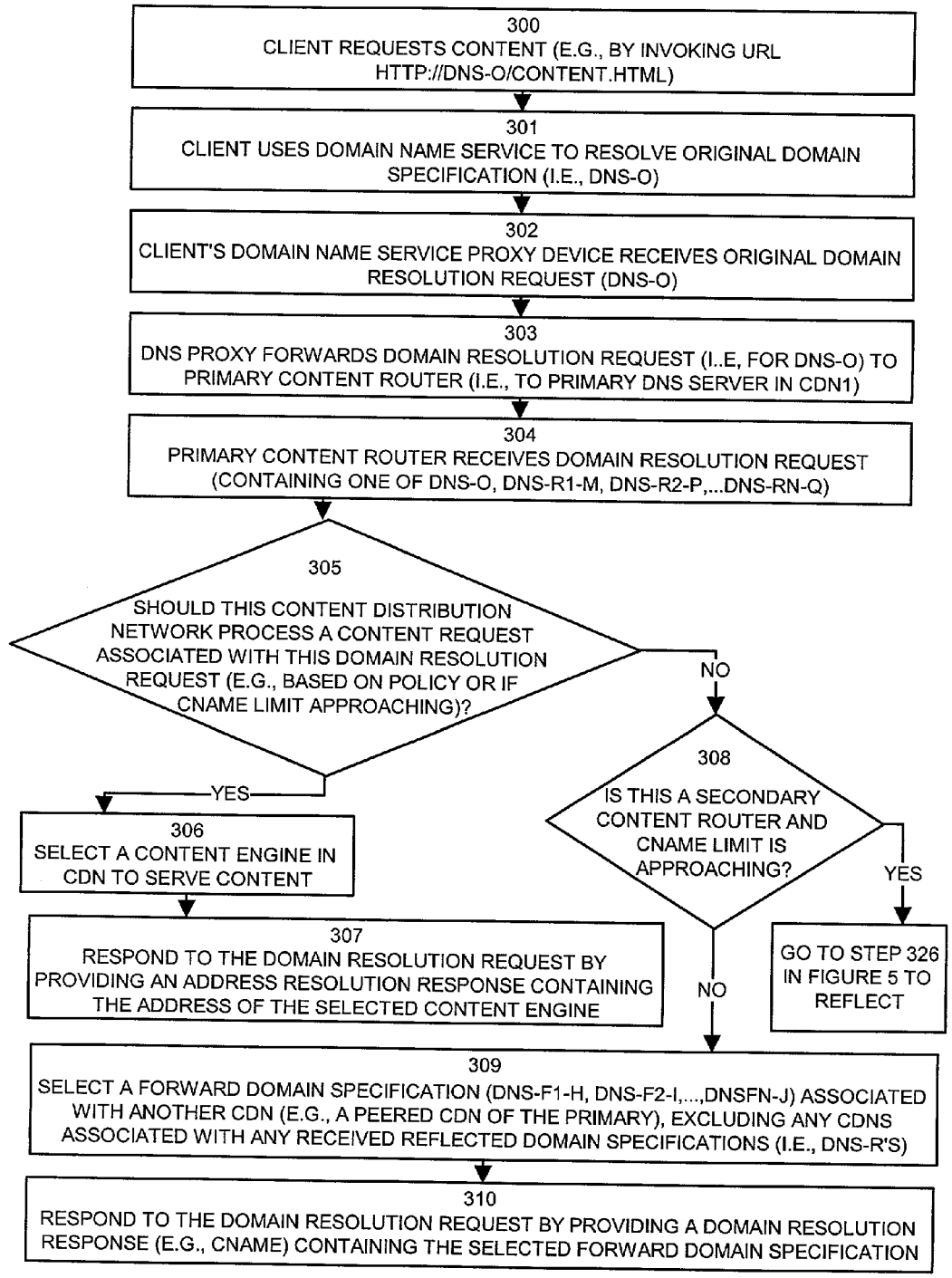
FIG. 4 is a flow chart of processing steps performed by a primary content router according to one example embodiment of the invention.
Figure 5:
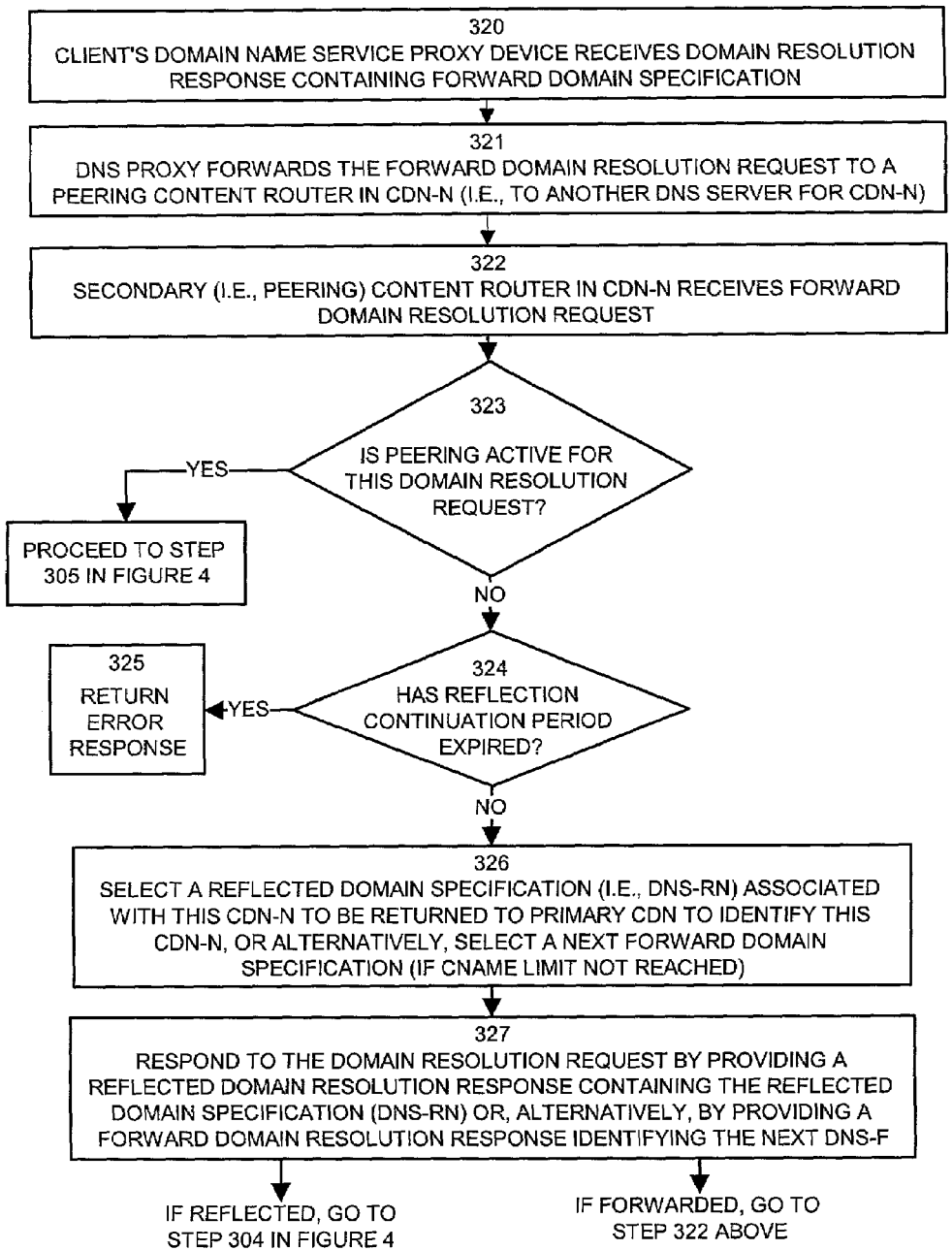
FIG. 5 is a flow chart of processing steps performed by secondary content routers operating within secondary content distribution networks in accordance with one example embodiment of the invention.

FIG. 4 illustrates a flow chart of processing steps as performed initially by a primary content router operating within the primary content distribution network 101-1 according to one example embodiment of the invention. The processing of the primary content router 110-1 begins in step 304, and steps 300 through 303 are provided to clarify an understanding of this embodiment of the invention. Steps 305 through 310 can also be performed by peering content routers in addition to the primary content router, as will be explained. It is to be understood that the following processing operations are provided as an example of operation of one embodiment of the invention and that variations to these processing operations can be performed according to other embodiments of the invention. As an example, whether a peering content router decides to forward or reflect a content resolution request can depend upon which embodiment of the invention is implemented. In addition, decisions to forward or reflect can be based on a peering policy that considers a number of different factors.

In step 300, the client computer system 160 operating a client application such as a web browser requests content associated with the original domain specification. As an example, a user controlling a Web browser operating within the client computer system 160 may invoke a URL such as http://DNS-O/content.htm. Upon doing so, the client computer system 160 requires that the original domain specification DNS-O be resolved into a network address of a specific content engine 120 within the computer network environment 100.

Accordingly, in step 301, the client uses the domain name service to resolve the original domain specification DNS-O, by providing the domain resolution request 200 to the DNS proxy server 150.

In step 302, the client DNS proxy device 150 receives the original domain resolution request 200 containing the original domain specification DNS-O.

In step 303, the DNS proxy server 150 forwards the original domain resolution request 201-1 for DNS-O to the primary content router 110-1 because the primary content router 110-1 is determined, by the DNS system, to be the particular network DNS device that is capable of resolving this original domain specification DNS-O into a network address.

In step 304, the primary content router 110-1 receives the domain resolution request 201 (201-1 in FIG. 3) containing one of either an original domain specification DNS-O or a reflected domain specification DNS-R1-M, DNS-R2-P, . . . DNS-RN-Q (DNS-O for this first iteration). In this iteration of FIG. 4, the primary content router received DNS-O. Note that the use of M, P and Q designate numeric indications that can be used to identify, based on the DNS name being resolved, how many hops or resolution attempts have been made prior to the current attempt. As explained above, this domain naming scheme allows a device to determine when a name resolution limit is being reached as explained above.

Next, in step 305, the content router determines, for example based on the peering relationship currently defined by a peering policy, if this content distribution network should process a content request associated with the domain resolution request 201. If the content router determines that a content request associated with the domain resolution request should be processed within this content distribution network (the primary content distribution network 101-1 for this first iteration), processing proceeds to step 306. However, if the content router determines that a content request associated with the domain resolution request should not be processed within this content distribution network 101-1, processing proceeds to step 308. Within a content router (primary or a peering content router), the decision made in step 305 can be based, for example, on examination of a peering policy in relation to an attribute of the domain resolution request, such as the name of the domain specification (e.g., DNS-O, or DNS-F or DNS-R), or another attribute such as the network identity (e.g., IP address) of the client's DNS proxy that submitted the domain resolution request or a proximity policy that indicates that another peering content distribution network is better suited to handle content requests associated with this domain. If step 305 is being performed in a primary content router and the DNS CNAME limit is approaching, processing proceeds to step 306 as well.

In step 306, the content router 110-1 selects a content engine 120 (i.e., one of 120-1 through 120-3) within the content distribution network associated with that content router to serve content associated with the domain specification. In other words, upon entering step 306, because a peering policy decision in the content router indicates that this content distribution network should process a content request associated with the domain resolution request, the content router selects a content engine within it's content distribution network (101-1 for the primary) to which a client will thus direct a content request.

After processing step 306, processing proceeds to step 307 at which point the content router responds to the domain resolution request 201 by providing an address resolution response (not shown in the example in FIG. 3, but shown as 202-1 in FIG. 1) containing the address of the selected content engine 120 from the content distribution network 101-1. In this manner, the content router directs content requests to a content engine within that content router's content distribution network.

Returning attention now back to step 305, if the content router determines that a content request associated with the domain resolution request (i.e., the original domain specification DNS-O in this first example iteration) is to be processed by another secondary peering content distribution network, processing proceeds to step 308.

In step 308, if the content router performing this processing is a secondary or peering content router and the CNAME limit is approaching, then instead of forwarding to another content distribution network, the domain resolution request should be reflected back to the primary content router (in this embodiment) and processing proceeds to step 326 in FIG. 5 to perform reflection. As an example, if the CNAME limit is 5, and the forward domain resolution request received at a peering (i.e., secondary) content router is www.f4.cdn5.com, then the "f4" portion indicates that only one more CNAME response can be used before the DNS CNAME limit is reached. Accordingly, since at this point in processing (i.e., at step 308) the content router has already determined that another content distribution network is to process a content request associated with this forward domain resolution request, and only one hop is remaining before the CNAME limit is reached, then the secondary or peering content router processing this iteration of step 308 proceeds to step 326 in FIG. 5 in which a reflected domain specification is selected such as www.r5.cdn5.cdn1.com, that identifies the current peering network (cdn5) and that identifies a CNAME hop count of 5 (f5) for return to the primary content router. If in step 308, either a primary content router is processing this step, or a secondary content router is processing this step but the CNAME limit is not approaching (i.e., the current hop count is not one less than the maximum), then processing can proceed to step 309 to continue forwarding to another peering content distribution network.

In step 309, the content router selects a forward domain specification (DNS-FN-2 203-1 in FIG. 3 for the primary content router), associated with another (i.e., a secondary or peering) content distribution network 101-1 through 101-N. If embodiments of the invention are configured such that peering or secondary content routers in secondary content distribution networks reflect domain resolution requests back to the primary in all cases (instead of forwarding to another peering content distribution network, assuming the CNAME limit is not reached), then the processing in step 309 excludes, from its selection of a forward domain specification, any forward domains associated with secondary content distribution networks 101-1 through 101-N from which the primary content router received reflected domain specifications. In other words, in step 308, if the processing of FIG. 4 is being performed in response to receipt of a reflected domain specification at the primary content router 110-1, this device selects a particular forward domain specification that is associated with a particular secondary content distribution network 101-1 through 101-N to which this domain resolution request 201-1 is to be sent, but excludes those forward domains for which the primary content router has already received reflected domain requests since it is now aware that peering has stopped for those secondary content distribution networks. The primary content router 110-1 can keep a table or other database to identity those secondary CDNs that have returned reflected domains for a particular peered domain of content.

In an alternative variation of step 309, the content router can select a next forward domain specification based on the hop count identified by the domain specification received in the domain resolution request (in step 304). This is illustrated in FIG. 3 and in the flow chart in FIG. 4 wherein, in step 304 (FIG. 4), the primary content router 110-1 receives (FIG. 3) the original domain specification DNS-O and selects, in step 308 (FIG. 4), a first forward domain specification 203-1 DNS-F1-1 that identifies a first peering content distribution network (F1) and that includes a hop count indication of "−1" indicating that this is the first CNAME resolution attempt at providing a domain resolution request on behalf of a content request. Accordingly, when the first peering content router 110-2 receives this forward domain resolution request DNS-F1-1, it can determine that one hop of CNAME request limit has "been used up" of a total DNS limit of five hops.

Next, in step 310, the content router responds to the domain resolution request 201 by providing the selected forward domain resolution response that contains the selected forward domain specification. As explained above with respect to FIG. 1, this causes the proxy domain name server 150 to provide a forward domain resolution request to a secondary content router associated with the selected forward domain specification.

FIG. 5 illustrates a flow chart of processing steps performed via a secondary content router 110-2 through 110-N according to one embodiment of the invention to process a forward domain resolution request containing a forward domain specification DNS-F (e.g., DNS-FN-M). The processing steps 320 and 321 in FIG. 5 are performed by the DNS proxy server 150, whereas steps 322 through 327 are performed by the secondary content router within the peering secondary content distribution network 101-2 through 101-N.

In step 320, and as illustrated in FIG. 3, the client's DNS proxy server 150 receives the domain resolution response 203-1 containing the forward domain specification DNS-F (DNS-F1-1, as selected by the primary content router in the example in FIG. 3). The DNS proxy server 150 must then resolve the domain specification DNS-F1-1.

In step 321, the DNS proxy server 150 forwards a forward domain resolution request 201-2 (containing the forward domain specification DNS-F1-2 in the example in FIG. 3) to the secondary content router 110-2 operating in the content distribution network 101-2.

In step 322, the secondary content router 110-2 in the secondary CDN 101-2 receives the forward domain resolution request 201-2 containing the forward domain specification.

In step 323, the secondary content router 110-2 determines peering is active for the forward domain resolution request based on a peering policy. If peering is active, processing proceeds to step 305 in FIG. 4 to either select a content engine in this content distribution network or to forward to another content distribution network (or reflect if the CNAME limit is approaching as explained above). If peering is not active, processing proceeds to step 324. In this manner, a content router in a secondary content distribution network will process a forward domain resolution request according to the steps 305 through 310 in FIG. 4 if peering is active. If peering is inactive, consideration is given to a reflection continuation period as will be explained next.

In step 324, the secondary content router 110-2 determines if a reflection continuation period has expired. If the peering relationship has changed so that this content distribution network no longer peers the requested content or has terminated the peering relationship entirely, then the secondary content distribution network may no longer be required to reflect requests back to the primary content distribution network, but instead can return an error message. Upon termination of a peering relationship, a secondary can begin tracking or counting down a reflection continuation period that defines a time to continue reflecting requests after termination of the peering relationship (for the content associated with the forward domain specification). If this time period has expired in step 324, processing proceeds to step 325 in which processing returns an error response since there is no requirement to reflect anything back to the primary content distribution network. The reflection continuation period might be any amount of time, such as 24 hours, or might be based, for example, on a number or count of reflections required to be performed by this secondary content distribution network before not being required to do so any more. Alternatively, in step 324, if the reflection continuation period has not yet expired, processing proceeds to step 326.

In step 326, depending upon the embodiment, the secondary content router 110-2 either selects a reflected domain specification DNS-R associated with this particular content distribution network 101-2 to be returned to the primary content distribution network 101-1 to identify this secondary content distribution network 101-2, or the secondary content router 110-2 can select another or next forward domain specification of another peering content distribution network. In other words, in step 324, if the reflection continuation period has not expired, one embodiment of the invention provides a reflected domain specification DNS-RN associated with this secondary content distribution network 101-N back to the primary counter router, thus indicating to this primary content router 110-1 that a particular secondary content distribution network 101-N is no longer in the peering relationship 190 for content associated with this reflected domain. Alternatively, in another embodiment, another peering network can be chosen using a forward domain specification, assuming the CNAME limit has not been reached.

Next, in step 327, the secondary content router 110-2 responds to the domain resolution request by providing either a reflected domain resolution response containing the reflected domain specification back to the primary content router or provides a forward domain resolution response to another peering content distribution network. In the case of reflecting, processing proceeds to step 304 in FIG. 4.

Returning attention now to FIG. 3, one example of the processing explained above is shown in the messages exchanged. In particular, after the first peering content router 110-2 provides a second forward domain resolution response 203-2 to the DNS proxy server 150 (containing DNS-F2-2), the DNS proxy server 150 then provides this forward domain specification to the second peering content router 110-3 for resolution. At this point, the second peering content router 110-3 provides an address resolution response 202 that contains a network address of a secondary content engine 120-N within the content distribution network 101-N associated with the second peering content router 110-3. This figure thus illustrates how the use of forward domain specifications can allow a set of peering content distribution networks to pass resolution requests from one to another. Note that just prior to reaching the CNAME limit in one of the peering content routers, processing can cause a reflection back to the primary for selection of a primary content engine (assuming the last peering content distribution network determined that it was not going to process such a content request associated with the last forward domain specification).

Figure 6:
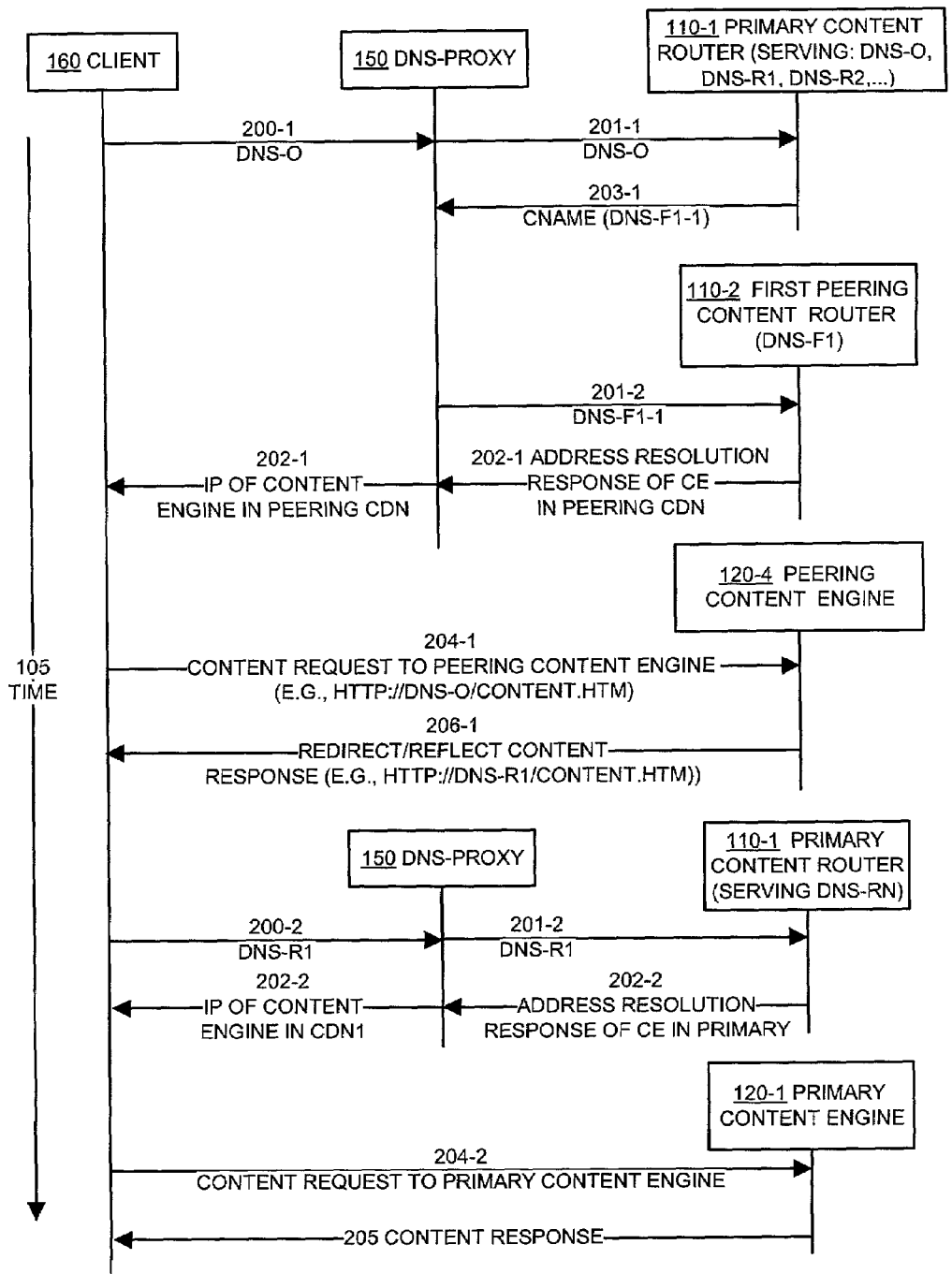
FIG. 6 illustrates an example of an exchange of messages as performed according to one embodiment of the invention to allow a client to obtain an address of a content engine and content from a content engine within a group of peering content distribution networks.

FIG. 6 illustrates an exchange of messages performed according another example operation of an embodiment of the invention. The processing in FIG. 6 is intended to convey that the general processing logic explained above with respect to content routers is applicable in content engines as well. That is, content engines configured according to embodiments of this invention can determine if they are to process particular content requests based on characteristics of the request as compared to a peering policy. If a content engine determines that it is not going to process a content request, the content engine can either select a forward domain specification to be included in a redirect request that will result in a client attempting to resolve this forward domain with another peering content distribution network. Alternatively, the content engine can select a reflected domain specification such that the primary content distribution network receives a reflect domain resolution request.

In this example on FIG. 6, a primary content router 110-1 receives an original domain resolution request 201-1 and returns a forward domain resolution response that causes a first peering content router 110-2 to resolve the forward domain resolution request (DNS-F1-1) into an address resolution response 202-1 containing the address of a peering content engine 120-4 within the secondary peering content distribution network 101-2. Then, when the client sends the content request 204-1 to this peering content engine 120-4, the peering content engine can consult a peering policy to make a decision as to whether to process this content request 204-1 or not. In this example, the peering policy may indicate, for example, that the peering relationship for this content in this content distribution network has expired, and thus the content engine 120-4 provides a redirect reflection content response 206-1 back to the client including the reflected domain specification DNS-R1. This causes the client to resolve the reflected domain specification which the client's DNS proxy server 150 provides as a reflected domain resolution request to the primary content router. Based on the format of the reflected domain specification, this can indicate to the primary content router that a content engine with a particular content distribution network has reflect a content request. In this example, the primary content router then selects a primary content engine to handle the content request and resolves the reflect domain into a selected primary content engine. The client is then able to obtain the requested content from the primary content engine.

Figure 7:
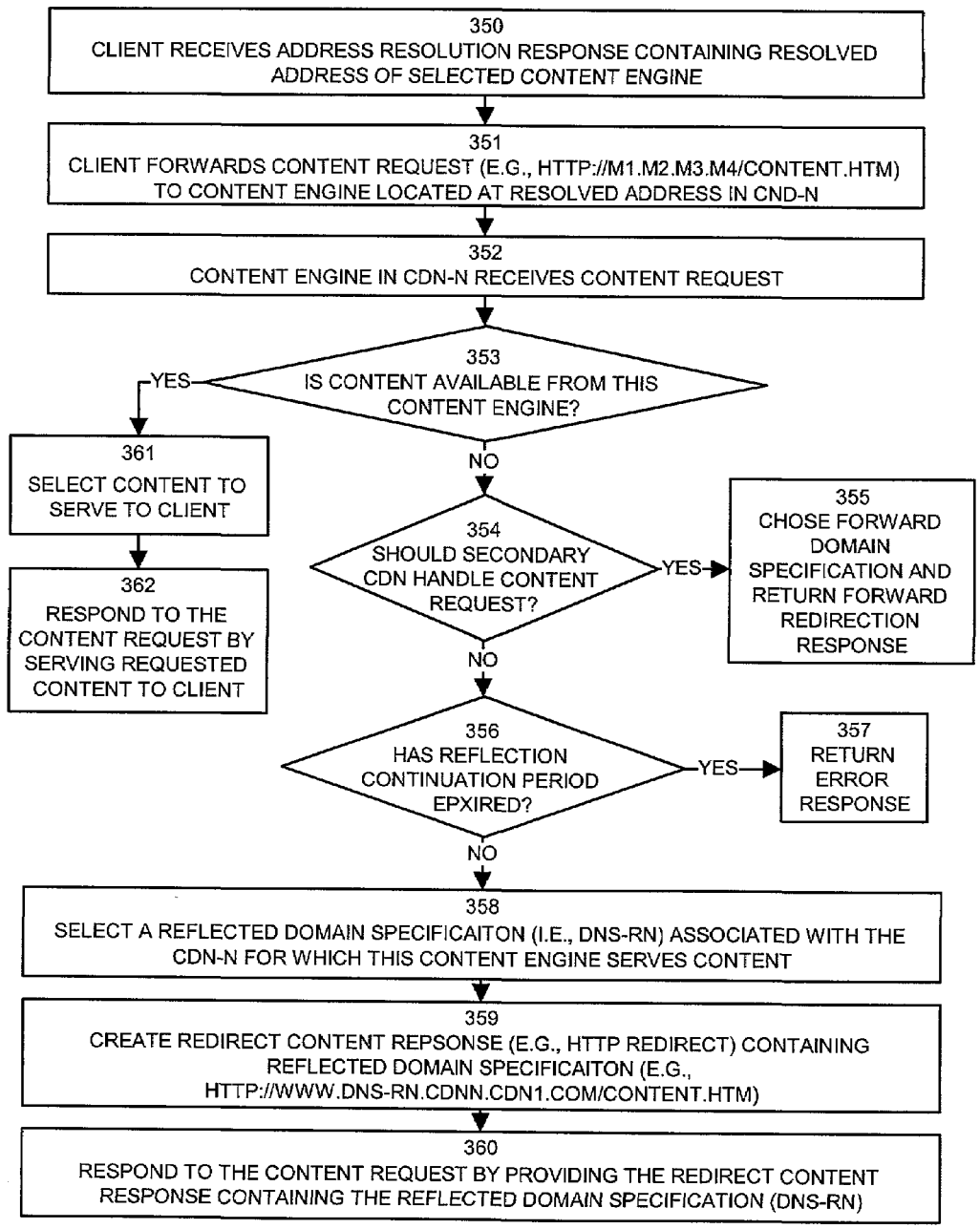
FIG. 7 is a flow chart of processing steps performed by a content engine to process a content request according to one embodiment of the invention.

FIG. 7 illustrates an example of content engine processing steps performed according to one embodiment of the invention that shows how a content engine 120 can process content requests received from a client computer system 160.

In step 350, the client computer system 160 receives the address resolution response 202 containing a resolved network address of a selected content engine 120 within a content distribution network 101.

In step 351, the client computer system 160 forwards a content request 204 to a content engine 120 located at the resolved address of the content distribution network.

Next, in step 352, the content engine 120-1 receives the content request 204 containing the URL that references specific content (i.e., content.htm) requested by the client computer system 160.

In step 353, the content engine 120 determines if the content request 204 is to be serviced by this content engine. The content engine 120 can make this determination based on a peering policy and can use factors such as the identity of the content specified or requested in the content request, the identity of the domain specification included in the content request, and identity of the client requesting the content or any other factors such as a load on the content engine. If the content engine 120 determines that the content request 204 is to be serviced by this content engine, processing proceeds to step 361.

In step 361, the content engine 120 selects the content to serve to the client computer system 160.

Next, in step 362, the content engine 120 responds to the content request 204 by serving the requested content to the client 160 in a content response 205 (as shown in FIG. 1).

Returning attention now to step 353 in FIG. 7, if the content engine determines that this content request is not to be serviced by this content engine, processing proceeds to step 354.

The determination that this content engine is not to service this request may have been made based on a policy decision that could have indicated that peering is inactive for the requested content. When peering is inactive, and during the time of the reflection continuation period that transpires after deactivation of the peering relationship, the content engine may still process the content request by reflecting it back to the primary content router (or by forwarding it to another content distribution network).

In step 354, the content engine determines if a secondary content distribution network can handle the content request. If so processing proceeds to step 355.

In step 355, the content engine chooses a forward domain specification and returns a forward redirection response that results in the client being redirected to the other secondary content distribution network.

Returning to step 354, if the content engine determines that a secondary content distribution network should not handle the content request, then reflection is to take place and processing proceeds to step 356.

In this example embodiment, in step 356, the content engine 120 determines if a reflection continuation period has expired in relation to the peering relationship 190 for the requested content specified in the content request 204. As discussed above, the reflection continuation period is an amount of time in which a secondary content distribution network 101-N will continue to reflect domain resolution responses and/or content requests after termination of a peering relationship 190. During non-termination of a peering relationship 190, the reflection continuation period is never expired. However, if for whatever reason the peering relationship 190 terminates (or changes so that requested content is not to be served), the reflection continuation period begins a countdown. If this time reaches zero then it has expired and the secondary content distribution network 101 no longer needs to reflect content requests and processing can proceed to step 357 at which point the content engine provides an error response to the client indicating that the requested content is not available. However, in step 356, if the reflection continuation period is not yet expired or if the peering relationship is still active or non-terminated, processing proceeds to step 358.

In step 358, the content engine 120 selects a reflected domain specification DNS-RN associated with the peering content distribution network 101-N for which this content engine 120 peers content.

Next, in step 359, the content engine creates a redirect/reflect content response 206, such as an HTTP redirect, containing the selected reflected domain specification. Reflection is illustrated in FIG. 6 in which the peering content engine 120-4 provides a redirect/reflect content response to redirect the client back to the primary content distribution network.

In step 360, the content engine 120-1 responds to the content request 204 by providing the redirect/reflected content response 206 containing the reflected domain specification. In this manner, the client 160 receives the redirect reflected content response 206 containing the new reflected domain specification (in the case of reflection) or another peering content distribution network receives a forward domain resolution request.

According to the aforementioned processing techniques, embodiments of the invention thus allow content distribution networks that operate in a peering relationship to redirect requests for content (or domain resolution requests upon which content requests will be based) between different content distribution networks.

Figure 8:
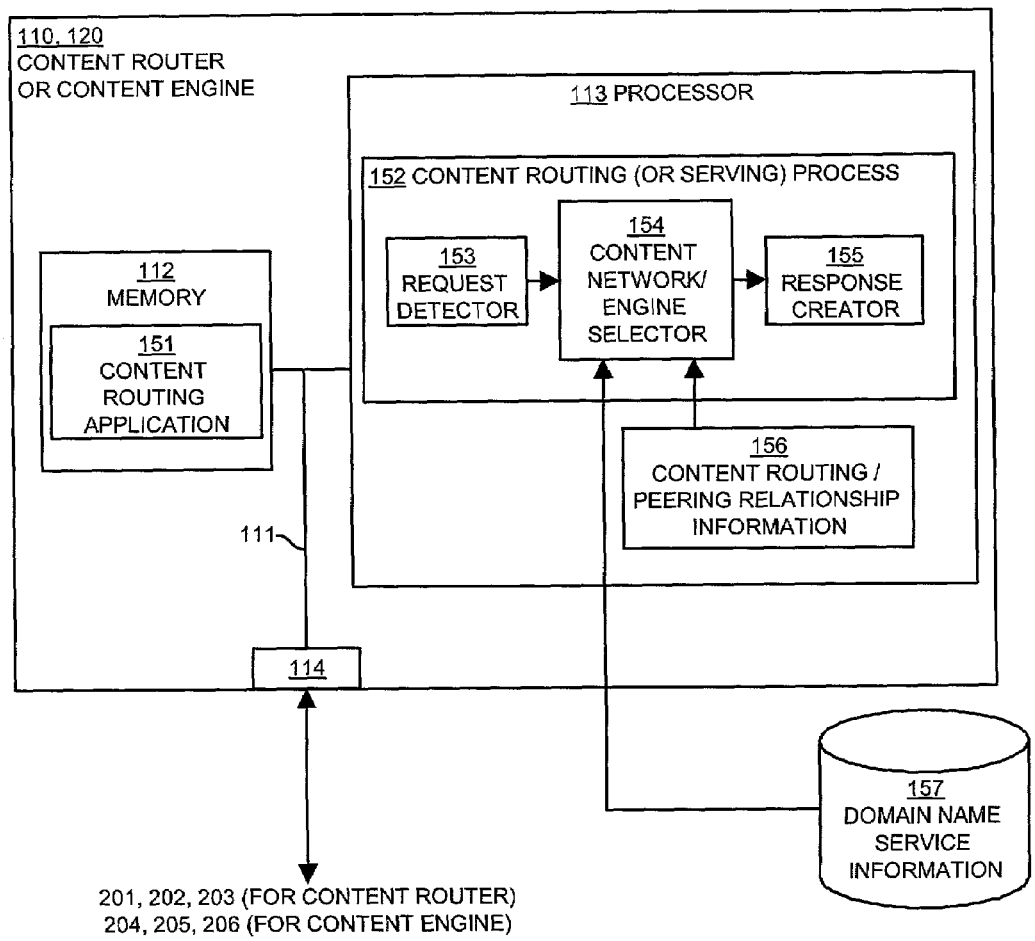
FIG. 8 illustrates an architecture of a content router and/or a content engine configured according to one embodiment of the invention.

FIG. 8 illustrates an example architecture of a content device (either a content router 110 and/or a content engine 120) configured according to one embodiment of the invention. In particular, the content device 110, 120 includes, in this example embodiment of the invention, an interconnection mechanism 111 such as a data bus and/or other circuitry that interconnects a memory 112, a processor 113 and one or more communications interfaces 114 (only one shown in this example).

The memory 112 may be any type of volatile or non-volatile memory or storage system such as computer memory (e.g., random access memory (RAM), read-only memory (ROM), or other electronic memory), disk memory (e.g., hard disk, floppy disk, optical disk and so forth). The memory 112 is encoded with logic instructions (e.g., software code) and/or data that form a content routing application 151 configured according to embodiments of the invention. In other words, the content routing manager application 151 represents software code, instructions and/or data that represent or convey the processing logic steps and operations as explained herein and that reside within memory or storage or within any computer readable medium accessible to the content device 110, 120.

The processor 113 represents any type of circuitry or processing device such as a central processing unit, microprocessor or application-specific integrated circuit that can access the content routing application 151 encoded within the memory 112 over the interconnection mechanism 111 in order to execute, run, interpret, operate or otherwise perform the content routing application 151 logic instructions. Doing so forms the content routing process 152. In other words, the content routing process 152 represents one or more portions of the logic instructions of the content routing application 151 while being executed or otherwise performed on, by, or in the processor 113 within the content device 110, 120.

The content routing process that operates in the content routers 110 and/or in the content engines 120 generally includes a request detector 153 for detecting inbound domain resolution or content request, a content network/engine selector for making determinations about serving content and selection of reflected domain names, and a response creator that formulates and transmits responses. Generally, the content routing process 152 is configured to operate according to the techniques explained above for the respective content routers and content engines. Thus, if the content routing process 152 operates in a content router 110, it performs that functions explained above for such devices, whereas if the content routing process 152 performs in a content engine, it works in conjunction with, for example, web server software to operate as explained above for such devices.

Those skilled in the art will understand that there can be many variations made to the embodiments explained above while still achieving the same objective of those embodiments and the invention in general. As an example, rearrangement of the processing steps in the flow charts may be performed by those skilled in the art while still achieving the objectives of embodiments of the invention as explained herein. Such variations are intended to be covered by the scope of this invention. As such, the foregoing description of embodiments of the invention is not intended to be limiting. Rather, any limitations to the invention are presented in the following claims.

What is claimed is:

1. In a content router associated with a first content distribution network, wherein the content router is a primary content router and the first content distribution network is a primary content distribution network in a peering relationship with a second content distribution network, a method for processing domain resolution requests, the method comprising the steps of:

receiving a domain resolution request, wherein the domain resolution request is an original domain resolution request that contains an original domain specification;

determining if a content request associated with the domain resolution request is to be processed by the first content distribution network;

determining that content associated with the original domain specification is to be obtained from the second content distribution network, and selecting a forward domain specification associated with the second content distribution network;

if the content request associated with the domain resolution request is to be processed by the first content distribution network, responding to the domain resolution request with an address resolution response associated with a content engine within the first content distribution network; and if the content request associated with the domain resolution request is not to be processed by the first content distribution network, responding to the domain resolution request with an alternative domain resolution response associated with a second content distribution network, wherein the alternative domain resolution response comprises a forward domain resolution response containing the forward domain specification that causes a device in the second content distribution network to receive a domain resolution request containing the forward domain specification.

2. The method of claim 1 wherein:

the content router is a primary content router and the first content distribution network is a primary content distribution network in a peering relationship with the second content distribution network; and wherein the step of determining if the content request associated with the domain resolution request is to be processed by the first content distribution network comprises the step of:

determining that the content request associated with the domain resolution request is to be processed by the first content distribution network;

selecting a content engine associated with the first content distribution network to service the content request associated with the domain resolution request; and wherein the step of responding to the domain resolution request with an address resolution response comprises the step of providing an address of the content engine in the first content distribution within the address resolution response.

3. The method of claim 1 wherein:

the content router is a primary content router and wherein the first content distribution network is a primary content distribution network in a peering relationship with the second content distribution network;

the domain resolution request is a reflected domain resolution request that contains a reflected domain specification from the second content distribution network; and wherein the step of determining if the content request associated with the domain resolution request is to be processed by the first content distribution network comprises the step of:

determining that a content request associated with the reflected domain specification should be processed within the first content distribution network;

selecting a content engine within the first content distribution network to process the content request associated with the reflected domain specification; and wherein the step of responding to the domain resolution request with an address resolution response comprises the step of providing an address of the selected content engine within the address resolution response.

4. The method of claim 3 wherein the first content distribution network is in a peering relationship with a third content distribution network in addition to the second content distribution network; and wherein the step of determining if a content request associated with the domain resolution request is to be processed by the first content distribution network comprises the steps of:

determining that content associated with the reflected domain specification is to be obtained from the third content distribution network with which the first content distribution network is in a peering relationship; and selecting a forward domain specification associated with the third content distribution network; and wherein the step of responding to the domain resolution request with an alternative domain resolution response comprises the step of providing a forward domain resolution response containing the forward domain specification to cause a device in the third content distribution network to receive a forward domain resolution request containing the forward domain specification.

5. The method of claim 3 wherein the step of determining if a content request associated with the reflected domain resolution request is to be processed by the first content distribution network comprises the steps of:

determining, based on a domain resolution request history, if a technique used to receive the reflected domain resolution request has reached a predetermined forwarding threshold, and if so, determining that the content request associated with the domain resolution request is to be processed by the primary content distribution network.

6. The method of claim 1 wherein:

the content router is a peering content router;

the first content distribution network is a peering content distribution network that peers content on behalf of the second content distribution network which is a primary content distribution network;

the domain resolution request is a forward domain resolution request that contains a forward domain specification; and wherein the step of determining if a content request associated with the domain resolution request is to be processed by the first content distribution network comprises the steps of:

determining that the content request associated with the forward domain specification is to be processed by a content distribution network other than the first content distribution network;

selecting a reflected domain specification associated with the first content distribution network; and wherein the step of responding to the domain resolution request with an alternative domain resolution response comprises the step of providing a reflected domain resolution response containing the reflected domain specification to cause a device in the second content distribution network to receive a reflected domain resolution request containing the reflected domain specification indicating that the first content distribution network was unable to process a request for content associated with the forward domain specification.

7. The method of claim 6 wherein the domain resolution request containing the forward domain resolution request indicates a domain resolution request history; and wherein the step of determining that the content request associated with the forward domain specification is to be processed by a content distribution network other than the first content distribution network comprises the steps of:

determining, based on the domain resolution request history, if a forwarding technique used to receive the domain resolution request has reached a predetermined threshold, and if so, determining that the content request associated with the forward domain specification is to be reflected to the primary content distribution network.

8. The method of claim 6 wherein the step of determining if a content request associated with the domain resolution request is to be processed from the first content distribution network comprises the step of:

consulting a peering policy to determine if the first content distribution network is in a peering relationship with the second content distribution network with respect to at least one portion of content associated with the domain resolution request.

9. The method of claim 8 wherein:

the peering policy indicates that the peering relationship between the first content distribution network and the second content distribution network is inactive;

wherein the peering policy specifies a reflection continuation period that defines a time after inactivation of the peering relationship that the first content distribution network is to continue to reflect requests for content on behalf of the second content distribution network; and wherein the step of consulting a peering policy comprises the steps of determining if the reflection continuation period has elapsed, and if the reflection continuation period has not elapsed, proceeding to perform the step of responding to the domain resolution request with an alternative domain resolution response.

10. The method of claim 1 wherein:

the content router is a peering content router;

the first content distribution network is a peering content distribution network that peers content on behalf of the second content distribution network which is a primary content distribution network;

the domain resolution request is a forward domain resolution request that contains a forward domain specification; and wherein the step of determining if a content request associated with the domain resolution request is to be processed by the first content distribution network comprises the steps of:

determining that a content engine within the first content distribution network is to process a content request associated with a forward domain specification identified in the domain resolution request;

selecting the content engine within the first content distribution network to process the content request associated with the forward domain specification identified in the domain resolution request; and wherein the step of responding to the domain resolution request with an address resolution response comprises the step of providing an address of the selected content engine in the first content distribution network within the address resolution response.

11. The method of claim 1 wherein:

the content router is a peering content router;

the first content distribution network is a first peering content distribution network that peers content on behalf of the second content distribution network which is a primary content distribution network;

the domain resolution request is a first forward domain resolution request that contains a first forward domain specification; and wherein the step of determining if a content request associated with the domain resolution request is to be processed by the first content distribution network comprises the steps of:

determining that the content request associated with the first forward domain specification is to be processed by a third content distribution network that peers content associated with the domain resolution request;

selecting a second forward domain specification associated with the third content distribution network; and wherein the step of responding to the domain resolution request with an alternative domain resolution response comprises the step of providing a forward domain resolution response containing the second forward domain specification to cause the third content distribution network to receive a domain resolution request containing the second forward domain specification.

12. The method of claim 11 wherein the first and second forward domain specifications contain an indication of a domain resolution request history.

13. The method of claim 1 wherein the domain resolution request contains a domain specification that indicates a domain resolution request history that identifies a domain resolution request hop count.

14. The method of claim 1:

wherein the first content distribution network is a primary content distribution network that is in a peering relationship with a set of other content distribution networks and the content router is a primary content router;

wherein each content distribution network in the set of other content distribution networks has an association to at least one respective forward domain specification that, when received in a domain resolution request by a content router in that respective content distribution network, indicates to that content router that another content distribution network is attempting to forward a content request to that respective content distribution network; and wherein each respective content distribution network in the set of other content distribution networks also has an association to at least one respective reflected domain specification that a respective content router in those respective content distribution networks can provide in a domain resolution response and that, when received in a domain resolution request by the primary content router in that respective content distribution network, indicates to that content router that another content distribution network is attempting to reflect a content request to that respective content distribution network.

15. In a content engine associated with a first content distribution network, a method for processing a content request, the method comprising the steps of:
receiving a content request, wherein the content request contains an original domain specification;
determining if the content request is to be processed by this content engine, wherein determining comprises determining that content associated with the content request is to be obtained from a second content distribution network, and selecting the forward domain specification associated with the second content distribution network;
if the content request is to be processed by this content engine, responding to the content request with a content response containing the content requested in the content request; and
if the content request is not to be processed by this content engine, responding to the content request with at least one of:
i) a redirect reflect content response sent to a primary content distribution network and containing a reflect domain specification that identifies a content distribution network associated with this content engine;
ii) a redirect forward content response containing a forward domain specification that identifies another peering content distribution network other than the first content distribution network to which the content request is to be forwarded, wherein the redirect forward content response containing the forward domain specification causes a device in the second content distribution network to receive a domain resolution request containing the forward domain specification.

16. The method of claim 15 wherein the step of determining if content associated with the content request is to be served from the content engine comprises the step of:
consulting a peering policy to determine if the first content distribution network is in an active peering relationship with the second content distribution network with respect to content associated with the content request.

17. The method of claim 15 wherein the content engine is in a secondary content distribution network and wherein:
the peering policy indicates that the peering relationship between the first content distribution network and the second content distribution network is inactive;
wherein the peering policy specifies a reflection continuation period that defines a time after inactivation of the peering relationship that the first content distribution network is to continue to peer content on behalf of the second content distribution network; and
and wherein the step of consulting a peering policy comprises the steps of determining if the reflection continuation period has expired, and if the reflection continuation period has not expired, proceeding to perform the step of responding to the content request with a redirect reflect content response.

18. The method of claim 15 wherein:
the content engine is a secondary content engine and the first content distribution network is a peering content distribution network; and
wherein the step of determining if the content request is to be processed by this content engine comprises the steps of:
determining that content associated with the content request is not to be obtained from the first content distribution network; and
selecting at least one of:
i) the forward domain specification associated with at least one other second content distribution network in a peering relationship with the first content distribution network; and
ii) a reflect domain specification associated with a primary content distribution network in a peering relationship with the first distribution network; and
wherein if the forward domain specification is selected, the step of responding to the content request with an redirect forward content response comprises the step of providing a redirect forward content response containing the forward domain specification to cause a device in at least one other second content distribution network to receive a domain resolution request containing the forward domain specification; and
wherein if the reflect domain specification is selected, the step of responding to the content request with an redirect reflect content response comprises the step of providing a redirect reflect content response containing the reflect domain specification to cause a device in the primary content distribution network to receive a domain resolution request containing the reflect domain specification.

19. A content router, wherein the content router is a primary content router that is part of a first content distribution network, wherein the first content distribution network is a primary content distribution network in a peering relationship with a second content distribution network, comprising:
at least one communications interface;
a memory;
a processor; and
an interconnection mechanism coupling the at least one communications interface, the memory and the processor; and
wherein the memory is encoded with an content routing application that when performed on the processor, produces a content routing process that causes the content router to process domain resolution requests by performing the processing steps of:
receiving a domain resolution request, wherein the domain resolution request is an original domain resolution request that contains an original domain specification;
determining if a content request associated with the domain resolution request is to be processed by the first content distribution network;
determining that content associated with the original domain specification is to be obtained from the second content distribution network, and selecting a forward domain specification associated with the second content distribution network;
if the content request associated with the domain resolution request is to be processed by the first content distribution network, responding to the domain resolution request with an address resolution response associated with a content engine within the first content distribution network; and if the content request associated with the domain resolution request is not to be processed by the first content distribution network, responding to the domain resolution request with an alternative domain resolution response associated with a second content distribution network, wherein the alternative domain resolution response comprises a forward domain resolution response containing the forward domain specification that causes a device in the second content distribution network to receive a domain resolution request containing the forward domain specification.

20. The content router of claim 19 wherein:

the content router is a primary content router and the first content distribution network is a primary content distribution network in a peering relationship with the second content distribution network; and wherein the step of determining if the content request associated with the domain resolution request is to be processed by the first content distribution network comprises the step of:

determining that the content request associated with the domain resolution request is to be processed by the first content distribution network;

selecting a content engine associated with the first content distribution network to service the content request associated with the domain resolution request; and wherein the step of responding to the domain resolution request with an address resolution response comprises the step of providing an address of the content engine in the first content distribution within the address resolution response.

21. The content router of claim 19 wherein:

the content router is a primary content router and wherein the first content distribution network is a primary content distribution network in a peering relationship with the second content distribution network;

the domain resolution request is a reflected domain resolution request that contains a reflected domain specification from the second content distribution network; and wherein the step of determining if the content request associated with the domain resolution request is to be processed by the first content distribution network comprises the step of:

determining that a content request associated with the reflect domain specification should be processed within the first content distribution network;

selecting a content engine within the first content distribution network to process the content request associated with the reflected domain specification; and wherein the step of responding to the domain resolution request with an address resolution response comprises the step of providing an address of the selected content engine within the address resolution response.

22. The content router of claim 21 wherein the first content distribution network is in a peering relationship with a third content distribution network in addition to the second content distribution network; and wherein the step of determining if a content request associated with the domain resolution request is to be processed by the first content distribution network comprises the steps of:

determining that content associated with the reflected domain specification is to be obtained from the third content distribution network with which the first content distribution network is in a peering relationship; and selecting a forward domain specification associated with the third content distribution network; and wherein the step of responding to the domain resolution request with an alternative domain resolution response comprises the step of providing a forward domain resolution response containing the forward domain specification to cause a device in the third content distribution network to receive a forward domain resolution request containing the forward domain specification.

23. The content router of claim 21 wherein the step of determining if a content request associated with the reflected domain resolution request is to be processed by the first content distribution network comprises the steps of:

determining, based on a domain resolution request history, if a technique used to receive the reflected domain resolution request has reached a predetermined forwarding threshold, and if so, determining that the content request associated with the domain resolution request is to be processed by the primary content distribution network.

24. The content router of claim 19 wherein:

the content router is a peering content router;

the first content distribution network is a peering content distribution network that peers content on behalf of the second content distribution network which is a primary content distribution network;

the domain resolution request is a forward domain resolution request that contains a forward domain specification; and wherein the step of determining if a content request associated with the domain resolution request is to be processed by the first content distribution network comprises the steps of:

determining that the content request associated with the forward domain specification is to be processed by a content distribution network other than the first content distribution network;

selecting a reflected domain specification associated with the first content distribution network; and wherein the step of responding to the domain resolution request with an alternative domain resolution response comprises the step of providing a reflected domain resolution response containing the reflected domain specification to cause a device in the second content distribution network to receive a reflected domain resolution request containing the reflected domain specification indicating that the first content distribution network was unable to process a request for content associated with the forward domain specification.

25. The content router of claim 24 wherein the domain resolution request containing the forward domain resolution request indicates a domain resolution request history; and wherein the step of determining that the content request associated with the forward domain specification is to be processed by a content distribution network other than the first content distribution network comprises the steps of:

determining, based on the domain resolution request history, if a forwarding technique used to receive the domain resolution request has reached a predetermined threshold, and if so, determining that the content request associated with the forward domain specification is to be reflected to the primary content distribution network.

26. The content router of claim 24 wherein the step of determining if a content request associated with the domain resolution request is to be processed from the first content distribution network comprises the step of:
consulting a peering policy to determine if the first content distribution network is in a peering relationship with the second content distribution network with respect to at least one portion of content associated with the domain resolution request.

27. The content router of claim 26 wherein:
the peering policy indicates that the peering relationship between the first content distribution network and the second content distribution network is inactive;
wherein the peering policy specifies a reflection continuation period that defines a time after inactivation of the peering relationship that the first content distribution network is to continue to reflect requests for content on behalf of the second content distribution network; and
wherein the step of consulting a peering policy comprises the steps of determining if the reflection continuation period has elapsed, and if the reflection continuation period has not elapsed, proceeding to perform the step of responding to the domain resolution request with an alternative domain resolution response.

28. The content router of claim 19 wherein:
the content router is a peering content router;
the first content distribution network is a peering content distribution network that peers content on behalf of the second content distribution network which is a primary content distribution network;
the domain resolution request is a forward domain resolution request that contains a forward domain specification; and
wherein the step of determining if a content request associated with the domain resolution request is to be processed by the first content distribution network comprises the steps of:
determining that a content engine within the first content distribution network is to process a content request associated with a forward domain specification identified in the domain resolution request;
selecting the content engine within the first content distribution network to process the content request associated with the forward domain specification identified in the domain resolution request; and
wherein the step of responding to the domain resolution request with an address resolution response comprises the step of providing an address of the selected content engine in the first content distribution network within the address resolution response.

29. The content router of claim 19 wherein:
the content router is a peering content router;
the first content distribution network is a first peering content distribution network that peers content on behalf of the second content distribution network which is a primary content distribution network;
the domain resolution request is a first forward domain resolution request that contains a first forward domain specification; and
wherein the step of determining if a content request associated with the domain resolution request is to be processed by the first content distribution network comprises the steps of:
determining that the content request associated with the first forward domain specification is to be processed by a third content distribution network that peers content associated with the domain resolution request;
selecting a second forward domain specification associated with the third content distribution network; and
wherein the step of responding to the domain resolution request with an alternative domain resolution response comprises the step of providing a forward domain resolution response containing the second forward domain specification to cause the third content distribution network to receive a domain resolution request containing the second forward domain specification.

30. The content router of claim 29 wherein the first and second forward domain specifications contain an indication of a domain resolution request history.

31. The content router of claim 19 wherein the domain resolution request contains a domain specification that indicates a domain resolution request history that identifies a domain resolution request hop count.

32. The content router of claim 19:
wherein the first content distribution network is a primary content distribution network that is in a peering relationship with a set of other content distribution networks and the content router is a primary content router;
wherein each content distribution network in the set of other content distribution networks has an association to at least one respective forward domain specification that, when received in a domain resolution request by a content router in that respective content distribution network, indicates to that content router that another content distribution network is attempting to forward a content request to that respective content distribution network; and
wherein each respective content distribution network in the set of other content distribution networks also has an association to at least one respective reflected domain specification that a respective content router in those respective content distribution networks can provide in a domain resolution response and that, when received in a domain resolution request by the primary content router in that respective content distribution network, indicates to that content router that another content distribution network is attempting to forward a content request to that respective content distribution network.

33. A content engine associated with a first content distribution network comprising:
at least one communications interface;
a memory;
a processor; and
an interconnection mechanism coupling the at least one communications interface, the memory and the processor; and
wherein the memory is encoded with a content routing application that when performed on the processor, produces a content routing process that causes the content engine to process content requests by performing the processing steps of:
receiving a content request, wherein the content request contains an original domain specification;
determining if the content request is to be processed by this content engine, wherein determining comprises determining that content associated with the content request is to be obtained from a second content distribution network, and selecting the forward domain specification associated with the second content distribution network;
if the content request is to be processed by this content engine, responding to the content request with a content response containing the content requested in the content request; and
if the content request is not to be processed by this content engine, responding to the content request with at least one of:
i) a redirect reflect content response sent to a primary content distribution network and containing a reflect domain specification that identifies a content distribution network associated with this content engine;
ii) a redirect forward content response containing a forward domain specification that identifies another peering content distribution network other than the first content distribution network to which the content request is to be forwarded, wherein the redirect forward content response containing the forward domain specification causes a device in the second content distribution network to receive a domain resolution request containing the forward domain specification.

34. The content engine of claim 33 wherein the step of determining if content associated with the content request is to be served from the content engine comprises the step of:
consulting a peering policy to determine if the first content distribution network is in an active peering relationship with the second content distribution network with respect to content associated with the content request.

35. The content engine of claim 33 wherein:
the peering policy indicates that the peering relationship between the first content distribution network and the second content distribution network is inactive;
wherein the peering policy specifies a reflection continuation period that defines a time after inactivation of the peering relationship that the first content distribution network is to continue to peer content on behalf of the second content distribution network; and
and wherein the step of consulting a peering policy comprises the steps of determining if the reflection continuation period has expired, and if the reflection continuation period has not expired, proceeding to perform the step of responding to the content request with a redirect reflect content response.

36. The content engine of claim 33 wherein:
the content request contains a forward domain specification; and
the content engine is a secondary content engine and the first content distribution network is a peering content distribution network; and
wherein the step of determining if the content request is to be processed by this content engine comprises the steps of:
determining that content associated with the content request is not to be obtained from the first content distribution network; and
selecting at least one of:
i) the forward domain specification associated with at least one other second content distribution network in a peering relationship with the first content distribution network; and
ii) a reflect domain specification associated with a primary content distribution network in a peering relationship with the first distribution network; and
wherein if the forward domain specification is selected, the step of responding to the content request with an redirect forward content response comprises the step of providing a redirect forward content response containing the forward domain specification to cause a device in the at least one other second content distribution network to receive a domain resolution request containing the forward domain specification; and
wherein if the reflect domain specification is selected, the step of responding to the content request with an redirect reflect content response comprises the step of providing a redirect reflect content response containing the reflect domain specification to cause a device in the primary content distribution network to receive a domain resolution request containing the reflect domain specification.

37. A computer program product having a computer-readable medium including computer program logic encoded thereon that, when performed in a content router having a coupling of a memory, a processor, and at least one communications interface, provides a method for processing domain resolution requests by causing the content router to perform the operations of:
receiving a domain resolution request, wherein the domain resolution request is an original domain resolution request that contains an original domain specification;
determining if a content request associated with the domain resolution request is to be processed by the first content distribution network;
determining that content associated with the original domain specification is to be obtained from the second content distribution network, and selecting a forward domain specification associated with the second content distribution network;
if the content request associated with the domain resolution request is to be processed by the first content distribution network, responding to the domain resolution request with an address resolution response associated with a content engine within the first content distribution network; and
if the content request associated with the domain resolution request is not to be processed by the first content distribution network, responding to the domain resolution request with an alternative domain resolution response associated with a second content distribution network, wherein the alternative domain resolution response comprises a forward domain resolution response containing the forward domain specification that causes a device in the second content distribution network to receive a domain resolution request containing the forward domain specification.

38. A computer program product having a computer-readable medium including computer program logic encoded thereon that, when performed in a content engine having a coupling of a memory, a processor, and at least one communications interface, provides a method for processing content requests by causing the content router to perform the operations of:
receiving a content request, wherein the content request contains an original domain specification;
determining if the content request is to be processed by this content engine, wherein determining comprises determining that content associated with the content request is to be obtained from a second content distribution network, and selecting the forward domain specification associated with the second content distribution network;

if the content request is to be processed by this content engine, responding to the content request with a content response containing the content requested in the content request; and if the content request is not to be processed by this content engine, responding to the content request with at least one of:

i) a redirect reflect content response sent to a primary content distribution network and containing a reflect domain specification that identifies a content distribution network associated with this content engine;

ii) a redirect forward content response containing a forward domain specification that identifies another peering content distribution network other than the first content distribution network to which the content request is to be forwarded, wherein the redirect forward content response containing the forward domain specification causes a device in the second content distribution network to receive a domain resolution request containing the forward domain specification.

39. A content engine comprising:
at least one communications interface;
a memory;
a processor; and
an interconnection mechanism coupling the at least one communications interface, the memory and the processor; and
wherein the memory is encoded with an content routing application that when performed on the processor, produces a content routing process that causes the content engine to process content requests by providing means including:
means for receiving a content request, wherein the content request contains an original domain specification;
means for determining if the content request is to be processed by this content engine, wherein means for determining comprises means for determining that content associated with the content request is to be obtained from a second content distribution network, and means for selecting the forward domain specification associated with the second content distribution network;
if the content request is to be processed by this content engine, means for responding to the content request with a content response containing the content requested in the content request; and
if the content request is not to be processed by this content engine, means for responding to the content request with at least one of:

i) a redirect reflect content response sent to a primary content distribution network and containing a reflect domain specification that identifies a content distribution network associated with this content engine;

ii) a redirect forward content response containing a forward domain specification that identifies another peering content distribution network other than the first content distribution network to which the content request is to be forwarded, wherein the redirect forward content response containing the forward domain specification causes a device in the second content distribution network to receive a domain resolution request containing the forward domain specification.

40. A content router comprising:
at least one communications interface;
a memory;
a processor; and
an interconnection mechanism coupling the at least one communications interface, the memory and the processor; and
wherein the memory is encoded with an content routing application that when performed on the processor, produces a content routing process that causes the content router to process domain resolution requests by providing a means including:
receiving a domain resolution request, wherein the domain resolution request is an original domain resolution request that contains an original domain specification;
determining if a content request associated with the domain resolution request is to be processed by the first content distribution network;
determining that content associated with the original domain specification is to be obtained from the second content distribution network, and selecting a forward domain specification associated with the second content distribution network;
if the content request associated with the domain resolution request is to be processed by the first content distribution network, responding to the domain resolution request with an address resolution response associated with a content engine within the first content distribution network; and
if the content request associated with the domain resolution request is not to be processed by the first content distribution network, responding to the domain resolution request with an alternative domain resolution response associated with a second content distribution network, wherein the alternative domain resolution response comprises a forward domain resolution response containing the forward domain specification that causes a device in the second content distribution network to receive a domain resolution request containing the forward domain specification.

* * * * *